(12) United States Patent
Jamtgaard et al.

(10) Patent No.: US 6,430,624 B1
(45) Date of Patent: Aug. 6, 2002

(54) INTELLIGENT HARVESTING AND NAVIGATION SYSTEM AND METHOD

(75) Inventors: Mark Jamtgaard, Mountain View; Jacob Sullivan, San Francisco; Tyler Kohn, Mountain View, all of CA (US)

(73) Assignee: Air2Web, Inc., Atlanta, GA (US)

( * ) Notice: Subject to any disclaimer, the term of this patent is extended or adjusted under 35 U.S.C. 154(b) by 0 days.

(21) Appl. No.: 09/503,797

(22) Filed: Feb. 14, 2000

Related U.S. Application Data

(60) Provisional application No. 60/160,801, filed on Oct. 21, 1999.

(51) Int. Cl.⁷ ............................................. G06F 15/173
(52) U.S. Cl. ....................................... 709/246; 709/217
(58) Field of Search ................................ 709/246, 217, 709/220, 221, 218, 202, 203, 219, 227, 228, 250

(56) References Cited

U.S. PATENT DOCUMENTS

| 5,835,785 | A |   | 11/1998 | Overtoom |         |
|-----------|---|---|---------|----------|---------|
| 5,835,789 | A | * | 11/1998 | Ueda et al. | 709/232 |
| 5,906,657 | A | * | 5/1999  | Tognazzini | 709/248 |
| 6,034,963 | A | * | 3/2000  | Minami et al. | 709/230 |
| 6,173,316 | B1| * | 1/2001  | Boor et al. | 709/218 |
| 6,205,485 | B1| * | 3/2001  | Kikinis  | 709/231 |

* cited by examiner

*Primary Examiner*—David Y. Eng
(74) *Attorney, Agent, or Firm*—Needle & Rosenberg, P.C.

(57) ABSTRACT

A content delivery system and method are provided in which different types of content may be delivered to different information appliances having different protocols and different browser specifications. The system permits internet content providers to create a single piece of content that is re-formatted automatically for the different information appliances.

48 Claims, 20 Drawing Sheets

INTELLIGENT HARVESTING AND NAVIGATION SYSTEM AND METHOD

This application claims benefit of provisional application Ser. No. 60/160,801 filed Oct. 21, 1999.

BACKGROUND OF THE INVENTION

This invention relates generally to a system and method for delivering content to information appliances and in particular to a system and method for permitting web pages in different formats to be communicated to various different information appliances having different display footprints.

Today, people have an unquenchable thirst for information that demands instant access at any time or place to the information. There has been explosive growth in the handheld computing market and in the cell phone market with over 300 million users worldwide. In addition, there has been a continued increase in the number of people with access to the Internet. These three different markets will soon converge as cell phones and handheld computers will have web browsers ("mini browsers") integrated therein. To promote the convergence, cell phone manufacturers and wireless data network providers have attempted to standardize Internet content distribution with the wireless application protocol (WAP). Internet content providers have been slow to adopt these standards and now several major device manufacturers have begun to create their own proprietary standards.

Two factors hinder the extension of the Web and is content from the personal computer (PC) environment with fairly standard display formats to the non-PC based information appliances and devices. First, re-purposing and converting existing PC-centric HTML web sites to the new breed of information appliances with drastically varying screen sizes is very problematic. For example, it is not appropriate to put the content of a PC-centric web site onto a small smart phone screen linearly. An intelligent navigation scheme that automatically converts content intended for the PC into content applicable to one or more different information appliances is needed. This intelligent navigation scheme would optimally vary its output based on the screen size of the particular information appliance. Second, most current wireless content delivery solutions demand adherence to proprietary browsers, proprietary mark-up languages and/or proprietary protocols.

As FIG. 1 illustrates, there are currently multiple different mark-up languages 2, multiple different protocols 3 and different browsers 4. For example, Phone.com has introduced both the HDML and the WML protocols for cellular telephones in the United States, whereas Japan has adopted the I-mode protocol. Palm Pilot devices support a variant of the HTML protocol that uses web-clipping, while Windows CE devices support only a limited HTML protocol using special software such as Pocket Explorer. To establish an effective wireless presence, a company with content must support the multitude of different information appliances 5, the different protocols 3, the different markup languages 2 and the different browsers 4.

The number of devices, protocols and mark-up languages create a large matrix of different combinations of devices, protocols and languages wherein each combination requires a different web server. The rewriting of a site for each mark-up language and for interfacing with each different protocol and screen size is expensive, complicated and time consuming. In addition, because each different device may have a different input/output format, such as a different screen size, the presentation of information on any one device is not optimized, for example, for its screen size due to the variety of formatting alternatives.

Most of the prior approaches to wireless content delivery have involved linking a certain browser with a certain protocol and a certain mark-up language. There is not a single standard that is pervasive throughout the multitude of wireless handheld devices and information appliances. As a consequence of this lack of a standard, content providers are forced to re-author and re-format their web pages in order to generate content for each of these devices.

Compatible languages, such as Extensible Markup Language (XML), a software language designed especially for Web documents, have become much more mature and permit re-formatting of HTML or XML web pages on-the-fly to formats that individual devices can utilize. However, none of these conventional systems and solutions provide a single unified system that permits web pages having different formats and mark-up languages to be delivered to different information appliances that may use different protocols, different browsers, or have different input/output formats (e.g., different screen sizes). Thus, none of the conventional systems provide an intelligent navigation system wherein content may be delivered in a customized manner to the different information appliances.

Another problem with the conventional systems is that content providers have not been able to control the "look and feel" of their site using these other solutions so that the site may look very different on different devices. It is desirable, however, to provide a system that will allow these sites to customize the presentation of their site web pages to the wide variety of information appliances. Thus, it is desirable to provide a content delivery system and method that solves the above limitations and problems with the conventional systems and it is to this end that the present invention is directed.

SUMMARY OF THE INVENTION

The content delivery system and method in accordance with the invention solves the above problems and limitations with conventional systems and solutions by providing a system and method that delivers Web-based content, commerce, enabling transactions, and services to a variety of information appliances and devices without requiring the re-authoring of the content information for display on each of these different devices.

In accordance with the invention, the system and method permits content to be input into the system in a variety of different formatting languages. In addition, the system permits the formatted content to be output in any mark-up language and protocol, such as WML, HTML, HDML, XML, etc. Advantageously, each display page on the device may be customized. To organize the content for display on the devices, the received content information may be mapped into a hierarchy of groups so that the content information can be optimally formatted for display on the devices according to the input/output format, such as the display screen size parameters of the devices.

In more detail, the method for content delivery may include intelligently harvesting content from a web page to provide that content to a plurality of different information appliances having different screen sizes. The intelligent harvesting may convert the content into a proprietary relational markup language (RML) and generate a tree and then a document object model from the RML content. The tree may then be analyzed and searched using a set of processing rules in order to generate content screens customized to each information appliance. A typical card builder may build the card corresponding to the customized content and a typical deck builder may build a deck of cards corresponding to the one or more display screens that make up the content for the particular information appliance. The deck of cards may then be converted into a presentation format and protocol for the particular information appliance and sent to that information appliance.

DETAILED DESCRIPTION OF A PREFERRED EMBODIMENT

The invention is particularly applicable to system and method for delivering web content to a variety of different information appliances having different display formats and different screen sizes and it is in this context that the invention will be described. It will be appreciated, however, that the system and method in accordance with the invention has greater utility such as to systems for delivering other types of content to devices having different input/output formats.

The content delivery system in accordance with the invention provides many advantages over the conventional systems. As described below, the system permits content in a variety of different formats, such as HTML, XML, raw data, etc., to be input into the system and then permits the content to be output in a variety of different output formats and protocols, such as WML, HTML, HDML, XML, etc so that the same incoming content may be displayed on many different information appliances and devices having different screen sizes. In a preferred embodiment, the system may use an XML data structure and the system may include one or more different software applications that may be based on the JAVA language.

In accordance with the invention, content providers do not have to change their existing infrastructure or use multiple different web servers to send information to various information appliances. In particular, the system receives incoming content on-the-fly from an Internet content provider thereby allowing for dynamic information generation. In more detail, the system in accordance with the invention manipulates standard web pages into a relational markup language (RML) that permits, for each information appliance, a "set" of pages that is more useful to the individual device and dependant on the device. Now, the content delivery system in accordance with the invention will be described.

Figure 1:
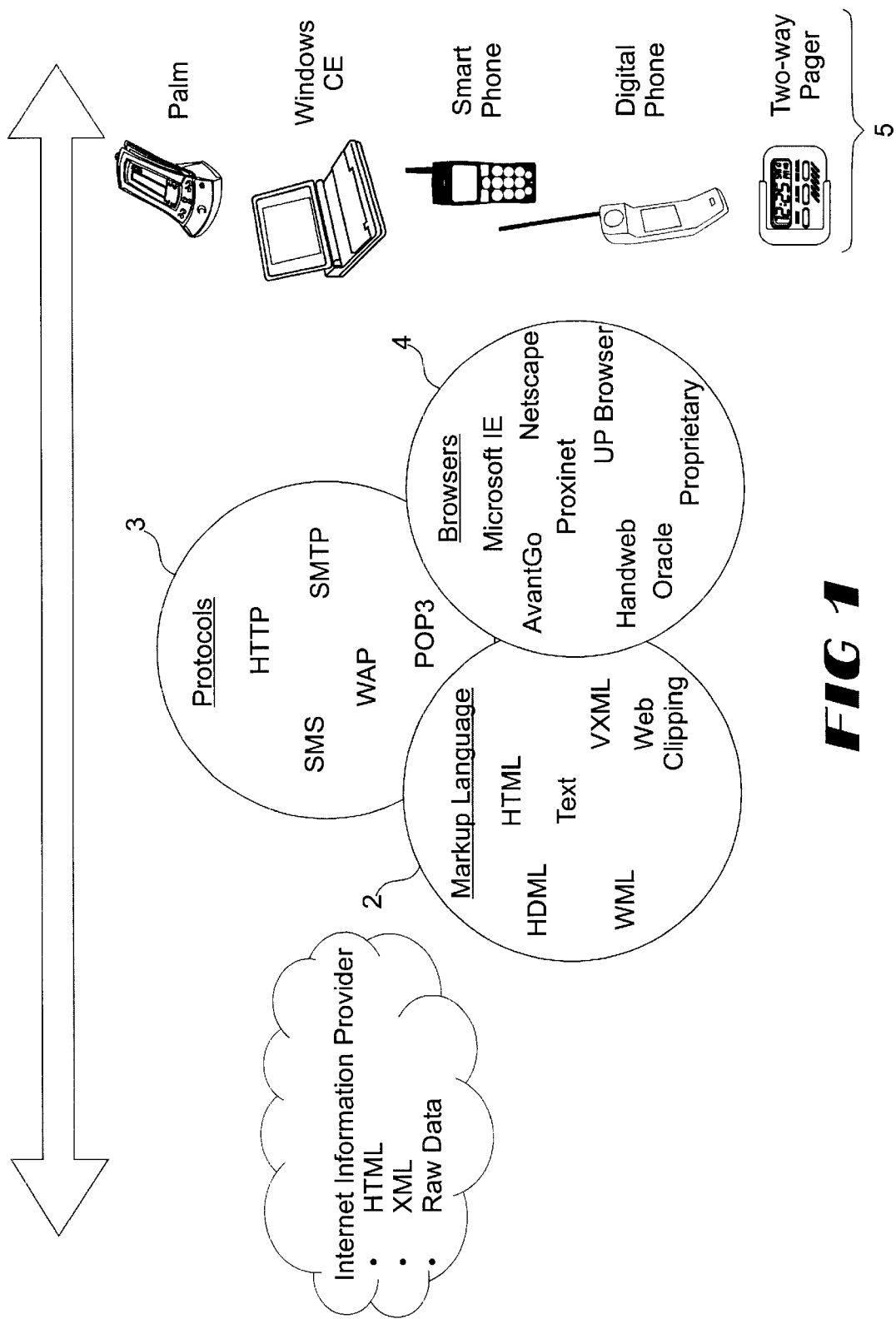
FIG. 1 is a diagram illustrating examples of different conventional wireless content delivery systems.
Figure 2:
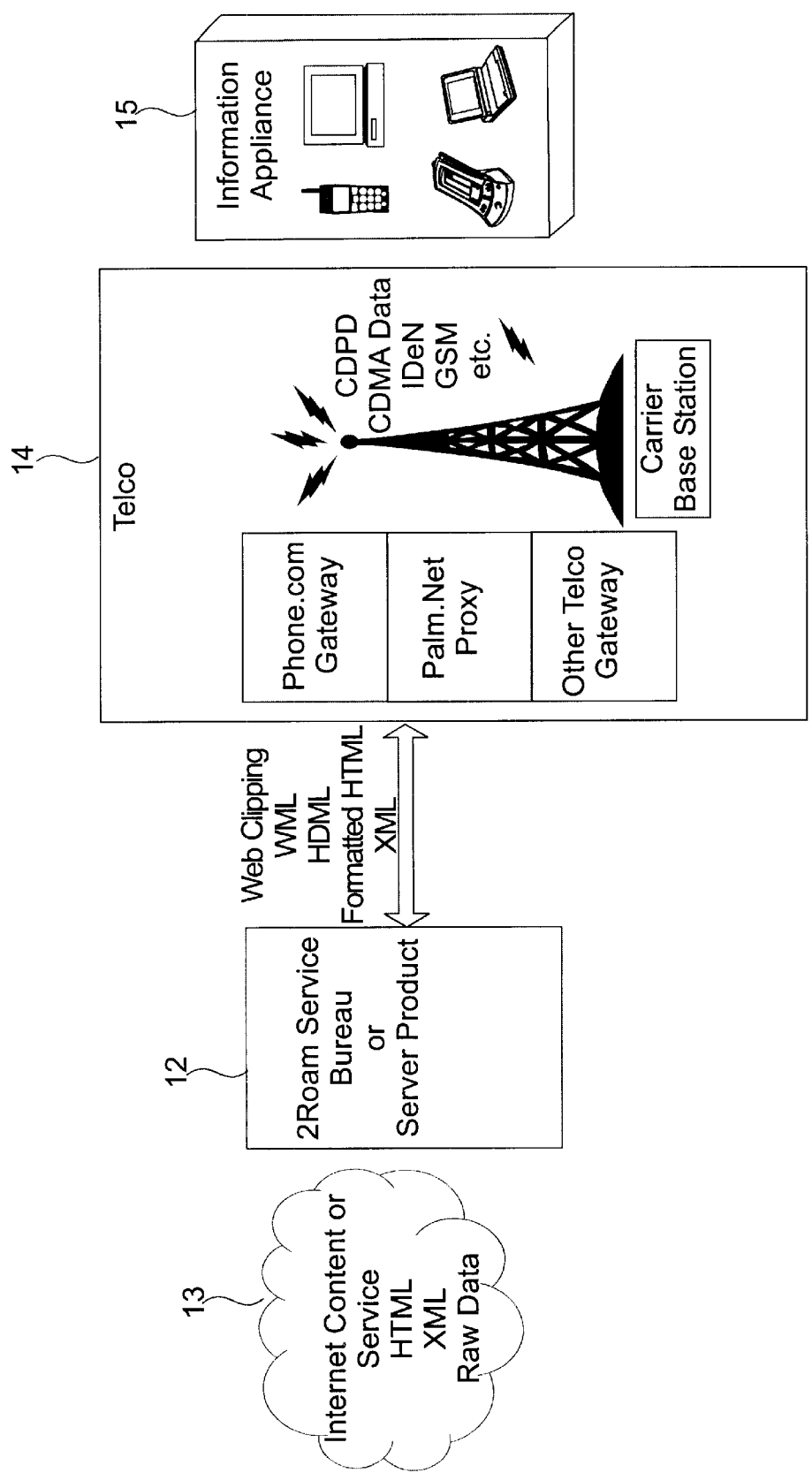
FIG. 2 is a block diagram illustrating a content delivery system in accordance with the invention.

FIG. 2 is a diagram illustrating a content delivery system 10 that may include a translation system 12 in accordance with the invention. The translation system 12 may be any computer system, such as a server or workstation, with sufficient computing power to handle the functions being performed as described below. In a preferred embodiment, the translation system 12 may be a server computer that stores one or more different software applications that may be executed by the CPU of the server in order to implement the functions of the content delivery system described below. The translation server 12 may allow content providers 13 to deliver their content (in different formats as shown) to one or more different information appliances 15 without needing to reformat, re-author or rebuild an existing web site in order to deliver it to the different information appliances 15 using different communications formats as shown. It is desirable to provide an upwardly scalable robust server 12 so that software can be coded without requiring updates as server loads increase. Rather, such increased server loads may be handled by adding additional hardware components, for example memory, to the server. It is also desirable that the server 12 be platform independent to support any operating system environment, such as UNIX, Windows, Macintosh and any other operating system.

In more detail, the translation server 12 may take information directly from an Internet content provider's web site in various forms, such as HTML data, XML data, or raw data feeds and then re-deliver it, via the translation server 12 and through a telecommunications system 14, such as, a wireless carrier base station that uses a typical communications format such as CDPD, to information appliances 15 in a format that is completely customized to the end user's device type and browsing capabilities. Thus, the content delivery system and method may generate and output WML, HDML, tiny HTML, compact HTML, HTML or XML data that is compatible with the particular information appliance 15. The information appliances 15 may be any type of device including WAP compliant cell phones, Windows CE devices, Palm OS devices, and any other HTML browser based devices.

For each wireless device 15, there may be a separate telecom system 14, such as different gateways or proxies to the different information appliances 15. Thus, in accordance with the invention, the content provider 13 may create a single piece of content in a single format and the telecom system 14 does not have to be modified in order to provide the wireless content in accordance with the invention to each separate wireless device 15. In addition, each Internet content provider 13 also has the ability to customize the appearance of their web site pages using the system's web based GUI tool. The GUI tool allows a web page producer or developer to create a set of rules that are used by the translation server 12 to describe how a particular web page is to be translated by the system 10. In particular, the "drag and drop" functionality of the GUI tool in a toolkit that allows a "producer" level employee to tailor the "look and feel" of the site so that, when the web site is delivered to a wireless device 15 via the system 10, the same "look mad feel" can be delivered as well. Now, more details of the wireless content delivery system will be described.

Figure 3:
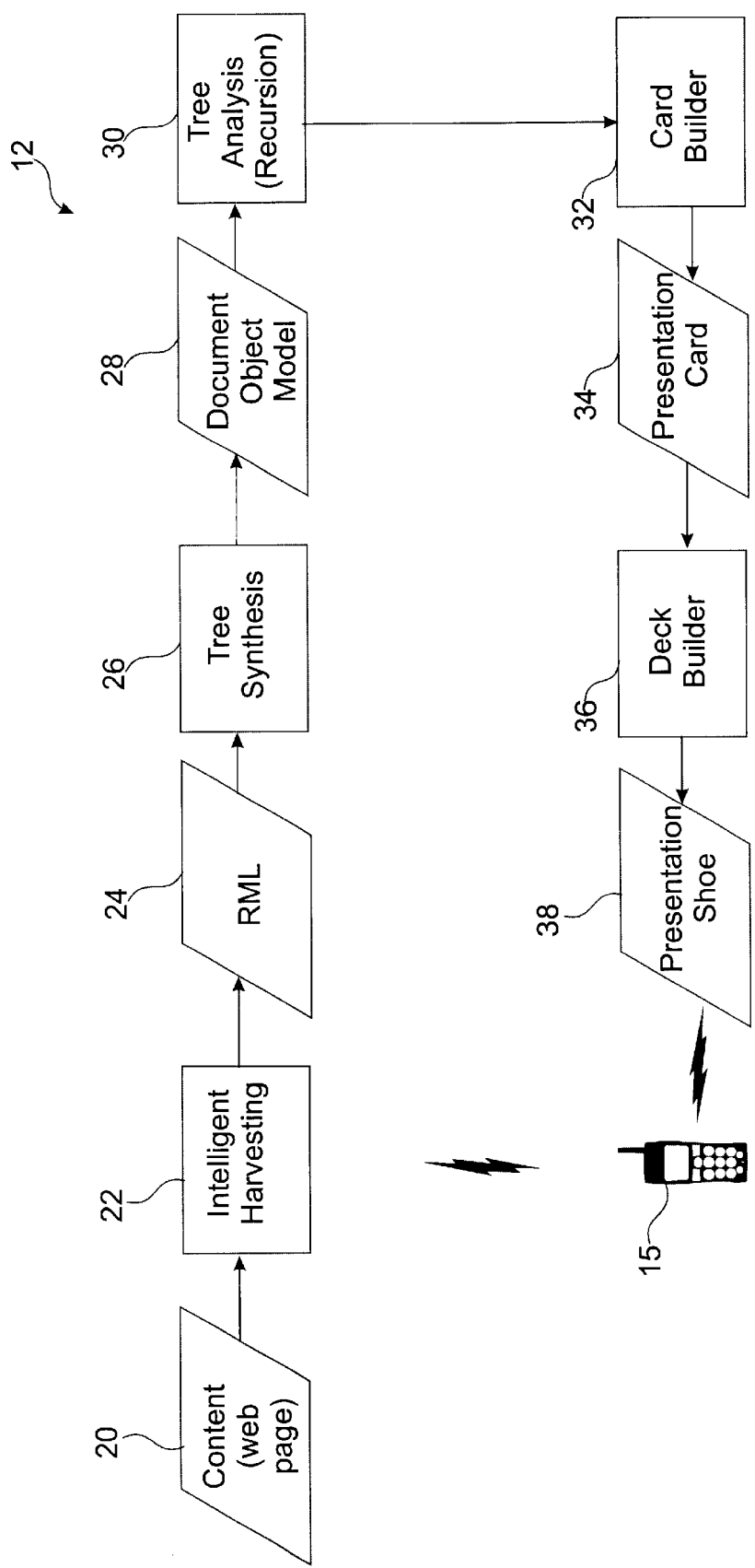
FIG. 3 is a functional diagram illustrating a content delivery system in accordance with the invention.

FIG. 3 is a functional diagram of the content delivery system and in particular the translation server 12 in accordance with the invention. In the example shown, the content 20 may be an HTML web page. The translation server 12 may include an intelligent harvester 22, a tree synthesizer 26, a tree analyzer 30, a card builder 32 and a deck builder 38 that generate a presentation shoe 38 that may be sent to a particular information appliance 15. To intelligently harvest an HTML web page not only involves grabbing the content on the site (scraping), but also allows any functionality on that site to be enabled on the target information appliance or device. This enabled functionality may include, for example, forms, transactions, javascript, cookies, session data and security measures. This enabled functionality is possible due to the virtual browser (See FIG. 7) that provides, for example, javascript and cookie proxy engines, so that an information appliance that cannot support javascript may do so with the javascript being eexecuted on the translation server. As another example, an information appliance may not support persistent session that may be required by the web site, but the virtual browser may enable a persistent session so that the web site thinks that it is interacting with an information appliance that has the persistent session capability. This process also involves applying a set of rules describing the relational context of the content (e.g., how a piece of, for example HTML code, relate to each other).

In more detail, the intelligent harvester 22 may receive the content and generate a relational data structure 24 that corresponds to the content as described below in more detail. The data structure containing the content in a relational format in accordance with a preferred embodiment of the invention is a proprietary relational markup language known as RML. RML is an XML based language which has the advantage of permitting the easy mapping of the content into a tree structure by the tree synthesizer 26 so that the tree synthesizer may output a typical document object model (DOM) 28. The DOM is a common object model used to manipulate markup such as HTML such as it disclosed on the W3C web site at http://www.wc3.org. Although it is typically used for manipulating HTML or XML, it also to provides the tree structure needed by the layout engine as described below during the tree analysis functions. Generally, a tree data structure is a method for representing a hierarchy of data using tree diagrams formed from nodes and line segments between the nodes. This may be a bit confusing because the DOM's tree structure may be used for both its intended purpose of storing the HTML markup contained in atomics, but also as a way of storing relational information about those atomics as described below in more detail.

The tree analysis function 30 may receive the DOM and then dynamically generate pages for a variety of different target screen sizes. In more detail, a typical, well known depth-first tree search algorithm, such as that described in the CRC Dictionary of Computer Science, Engineering and Technology, is used to recurse through the atomics and groups with complicated rules as described below for optimally filling pages with content while creating an intelligent navigation scheme in accordance with the invention. The Card Builder function 32 may apply the protocol specific syntax needed by the particular target device and output a presentation card 34. In accordance with the WAP protocol, the Deck Builder 36 is needed to put the cards into decks and into a presentation shoe 38 to optimize transmission latency through wireless networks. The system also permits the intelligent interaction of the information appliance with the web site since the system may enable functionality not typically supported by the information appliance via the virtual browser. The functionality of the content delivery system will be described in more detail below. Now, a preferred hardware implementation of the content delivery system in accordance with the invention will be described.

Figure 4:
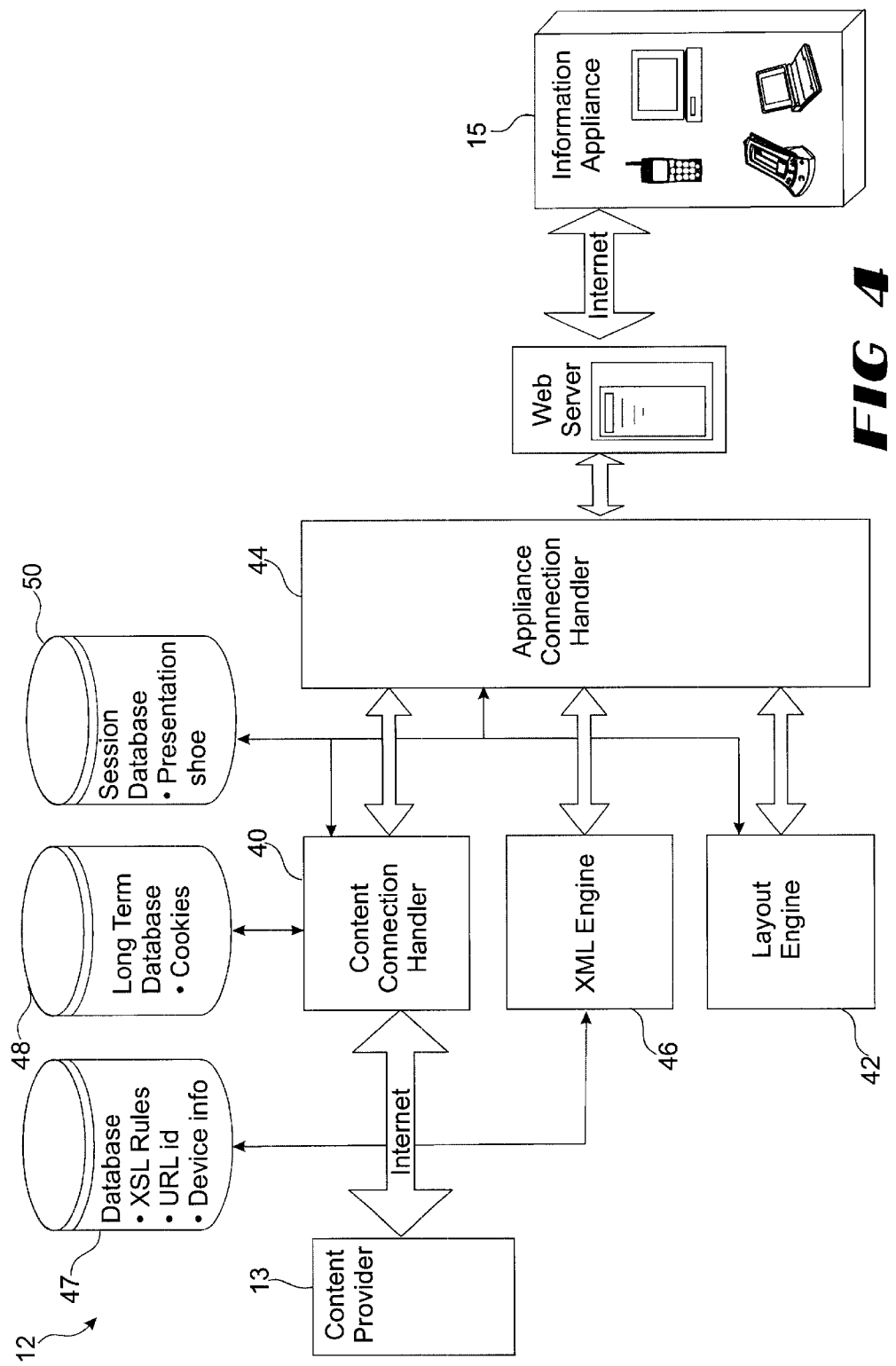
FIG. 4 is a diagram illustrating the translation server of the content delivery system shown in FIG. 2.

FIG. 4 is diagram illustrating a preferred implementation of the translation server 12 of the content delivery system 10 in accordance with the invention. In particular, the server 12 may include a content connection handler 40, a layout engine 42, an appliance connection handler 44 and an XML engine 46. The translation server 12 may also include a database 47 that may contain XSL rules used by the XML engine 46 for converting XHTML pages into RML, one or more URL Ids and various device information. In accordance with the invention, each XSL rule may be indexed in the database based on an ID (the ID may contain a URL, a name/value pair and cookie information) so that the system may determine which rule applies to which incoming URL. The device information may be used by the layout engine 42 in order to convert the RML data into one or more cards in a deck that may be displayed on the particular device. For example, the information may indicate the amount of information that may be fit on each screen. The translation server 12 may also include a long term database 48 that may contain cookies so that the system knows which pages have been processed previously and a session database 50 that stores a presentation shoe for each device.

Web page requests made by an information appliance 15 to an Internet content provider 13 may occur using, for example the Wireless Application Protocol (WAP), a wireless data transmission standard described in the WAP 1.2 Specification Suite located at http://www.wapforum.org, incorporated herein by reference. Generally, in accordance with the WAP protocol, an information appliance 15 may initiate a request in WML (Wireless Markup Language), a language derived from XML especially for wireless network characteristics. This request is passed to a WAP gateway that then retrieves the information from the Internet. The requested information is then sent from the WAP gateway to the WAP client (the device 15), using whatever mobile network bearer service is available and most appropriate.

The data transmitted over the telecommunications network 14 (See FIG. 2) is represented as a group of data packets and electronically routed over the telecommunications network 14 to an appropriate destination node, such as an appropriate information appliance 15. The packets of data include header information that describes the information contained in the data packets, such as the type of data contained in the packet, i.e. HTML, voice, ASCII, etc., and origination and destination node information, and is used by the system 10 to route and configure the data packets for transmission through the wireless network 14, according to well known network routing techniques.

In accordance with the invention, when an information appliance 15 requests a web page from the content provider 13, the content provider 13 examines the header information contained in the data packets and redirects any non-PC requests to the translation server 12. In accordance with the invention, content from an Internet content provider 13 is received by the content connection handler 40. The content connection handler 40 mimics a standard HTML browser, such as Internet Explorer or Netscape, and functions as the interface with a content provider's web site. Non-PC requests are redirected to the translation server 12 so that the web page information can be translated into a data format appropriate for and recognizable by the destination information appliance 15. Desktop PC requests do not need to be redirected to the translation server 12 since these devices are able to display web pages in standard HTML or other similar formats and do not require customized web page information.

The appliance connection handler 44 operates as a Web server for a requesting information appliance 15. The appliance connection handler 44 brokers and controls the entire transaction between the requesting device 15 and the translation server 12. For example, the appliance connection handler 44 may handle the session with each telecom system 14 or wireless device 15 and may perform various functions such as establish a session with the information appliance or wireless device 15, retrieve page information from the content connection handler 40, translate received pages using the XML engine 46 and the layout engine 42 as described below, and transmit the translated page information to a requesting information device 15 with appropriate header information. The appliance connection handler 44 may also determine state information of the devices 15, synchronize the devices 15, determine browser and protocol information and perform various security operations.

The XML engine 46 converts the XHTML page, generated by the content connection handler 40, to a proprietary markup language, RML—the Relational Markup Language, using a rule-set that may be stored in a database 47. RML is a markup language written in XML. Each page-type may include 1) a XSL rule-set that specifies what pieces of content to display on vary appliances as well as the relational structure amongst those pieces of content; and 2) a perl script. XSL is a language for transforming an XML document into another XML document as described at the W3C website located at http://www.w3c.org. The XSL rulesets used by the XML engine 46 may be stored in a database 47 indexed by ID page-type identifiers. The XSL rule-set may be used to process hierarchical elements of the content while the perl script may be used to process unstructured markup in the content. In accordance with the invention, a unstructured tag may be used to mark the markup that may be processed using the perl script. Each page-type has a rule-set and possibly a perl script associated with it. In accordance with the invention, the XSL rule-set and the perl script may be generated manually or may be automatically generated. The information stored in the database 47 can be used by the XML engine 46 when converting page information.

The layout engine 42 processes the content to convert the relational RML content, received from the XML engine 46, into device and protocol specific mark-up language formats. Formatted output provided by the layout engine 42 will be referred to herein as a "presentation shoe." For purposes of this description, a presentation shoe consists of "decks" and "cards." A deck is the smallest unit of content that is sent to a device. In certain protocols, such as WML and HDML, a deck can contain multiple cards. The presentation shoe thus contains the original HTML content of a webpage that is reformatted into an appropriate format language and targeted at an information appliance 15. The presentation shoe is formatted specifically for the target appliance's screen size, user interface and protocol. Advantageously, the presentation shoe is created dynamically in accordance with relational information in the RML data, which will be described in detail herein. Information about the presentation shoe can be stored in a session database 50 that may be in communication with the layout engine 42. Now, the details of the operation of the translation server will be described.

Figure 5:
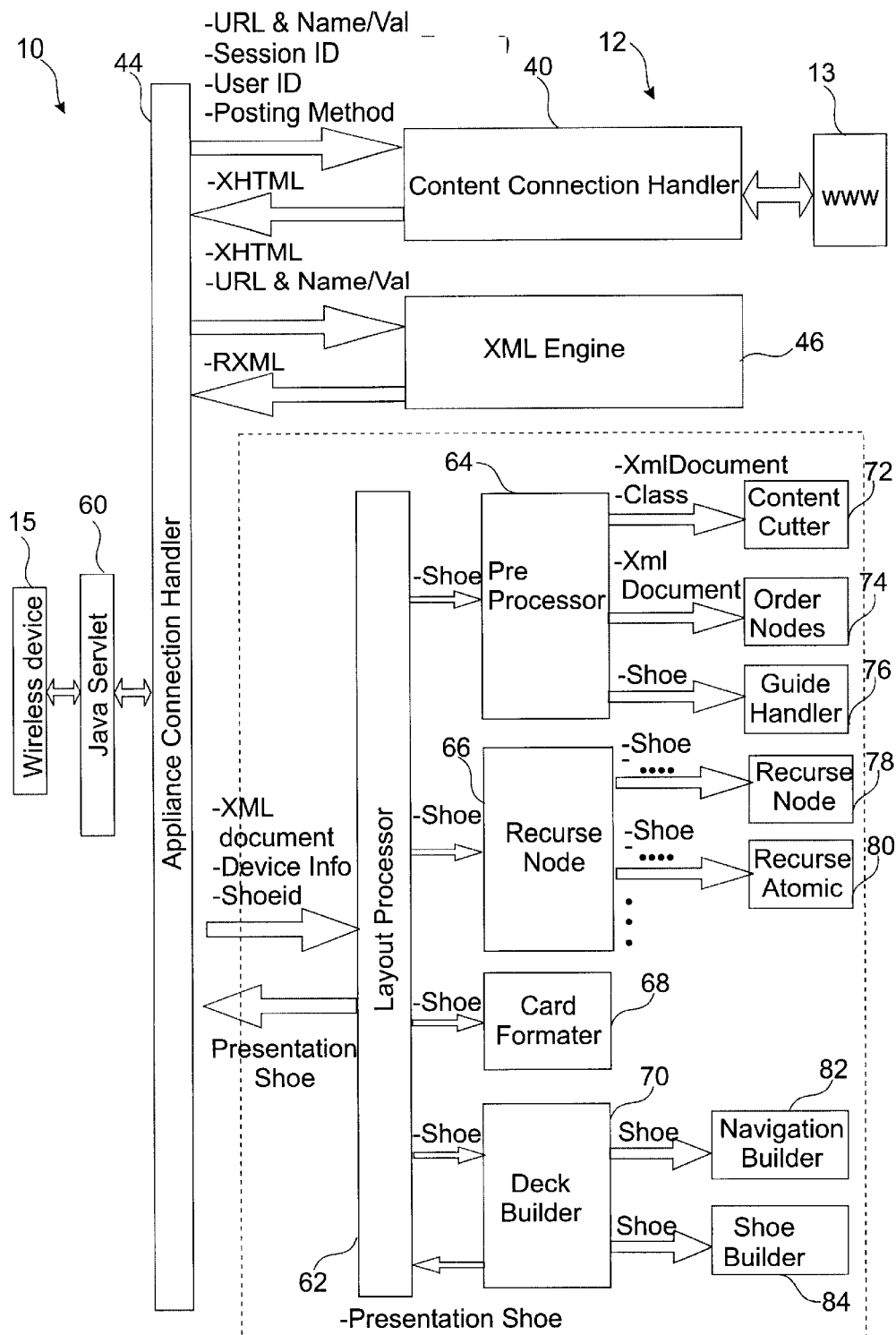
FIG. 5 is a block diagram illustrating an embodiment of the content delivery system of the invention.

FIG. 5 is a block diagram illustrating operation of the wireless content delivery system 10 of the invention. As described above and shown in FIG. 5, an information appliance 15 may request page information of a particular URL website from a content provider 13. The request by the information appliance 15 may be redirected, for example, via a JAVA servlet 60, to the translation server 12. The appliance connection handler 44 examines header information from the requesting data in order to determine a target device 15, protocol and browser configuration. The appliance connection handler 44 then requests the desired URL information from a content connection handler 40. The appliance connection handler 44 may relay information about the requesting wireless device 15 to the content connection handler 40 such as a requested URL address of a content provider 13, a session ID, a user ID and a wireless device's browser capabilities. The content connection handler 40 retrieves the requested information from the content provider 13, renders any JavaScript, stores any cookies and returns the requested information as XHTML data to the appliance connection handler 44.

The appliance connection handler 44 then requests the XML engine 46 to convert the received XHTML data to RML data and assign atomics into the relational structure according to page type so that presentation cards can be created and placed in a presentation shoe so that the cards can be transmitted to the target device 15. The XML engine 46 will be described in more detail below with reference to FIGS. 7–9.

The application connection handler 44 then conveys the RML data output from the XML engine and device information (stored in the database 47 shown in FIG. 4) to the layout engine 42 so that the layout engine 42 can generate a device and protocol specific set of cards that are served to the requesting appliance 15 by the appliance connection handler 44, via the presentation shoe.

In more detail, the layout engine 42 may include a layout processor 62, a preprocessor 64, a recursenode module 66, a card formatter 68, a deckbuilder 70, a contentcutter 72, a ordernodes module 74, a guidehandler 76, a recursenode and recurse atomic module 78, 80, a navigation builder 82 and a shoebuilder 84. The layout processor 62 may receive the XML DOM, the device information from the database 47 and the shoeID and may forward the shoe information to a preprocessor 64. The preprocessor may forward the XML DOM and class information to a content cutter 72 that operates on the RML data to remove any classes of information that cannot be displayed on the particular information appliance or wireless device 15 based on the device information from the database 47. Once the classes are removed, an ordered structure of atomics is generated from the RML data by the OrderNodes module 74 so that, for example, a tree structure describing the relation of different portions of the content information to be displayed on the device 15, can be created. A GuideHandler module 76 permits the system to put a template on each card of the first card in a shoe delivered to an information appliance. For example, the logo of a company may be displayed in the corner of each page displayed to the information appliance. The navigation builder 82 may permit links between cards and other items to be placed on a card. For example, a particular web page may always have one or more navigation links on each page (e.g., support, products, etc.) that may be placed on each card by the navigation builder.

The RecurseNode module 66 and 78 may then operate on the tree structure to group related content information so that appropriate cards can be created for presentation on the wireless device 15. The recursion of the nodes in the tree is described in more detail below with reference to FIG. 14. In processing the tree structure, the card formatter module 68 may generate presentation cards that include the appropriately grouped atomics as determined by the recursenodes and recurseatomic modules 66, 78, 80. The deck builder module 70 may then groups the plurality of presentation cards into decks so that the deck can be organized into an appropriate presentation shoe to optimize the wireless link between the system and the information appliance. To perform the above function, the deckbuilder 70 may include the navigation builder 82 that builds the navigation path between the cards in the deck and the shoebuilder 84 that actually builds the presentation shoe.

Once the presentation shoe is completed by the layout engine 42, it returns the presentation shoe to the appliance connection handler 44. The appliance connection handler 44 then may relay the presentation shoe, for example via the JAVA servlet 60 to the appropriate requesting wireless device 15 so that the content information from the content provider 13 can be displayed in a format appropriate for the wireless device 15.

Figure 6:
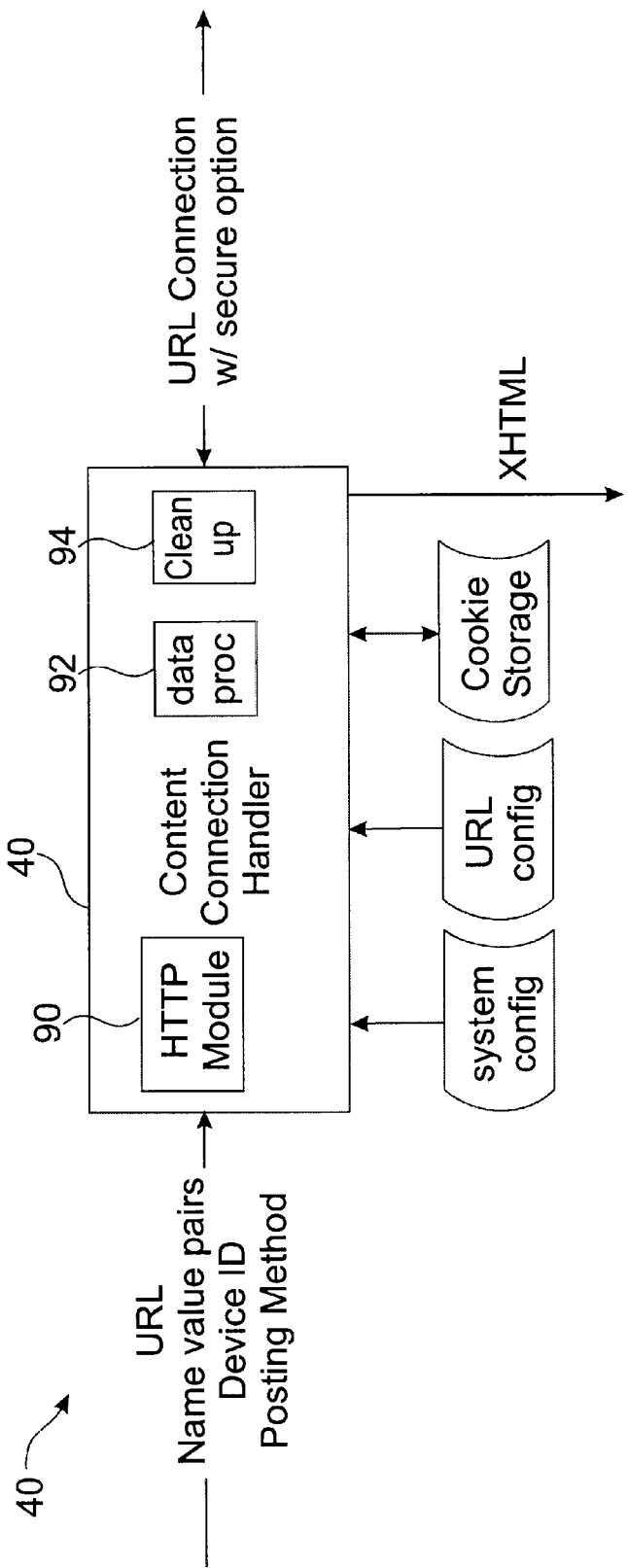
FIG. 6 is a diagrammatic view illustrating the content connection handler of the translation server shown in FIG. 4.

FIG. 6 is a diagrammatic view illustrating the function of the content connection handler 40. The content connection handler 40 establishes an on-line session with a web site in order to receive webpage content to be converted. In a preferred embodiment, HTML pages are retrieved from a specified URL website and the retrieved HTML information is formatted as XHTML, an XML compliant HTML format utilized by the translation server 12 and represented by a document object model (DOM). A DOM is a common object model used to manipulate markup. This structure is used to translate the HTML page information to a format that can be translated by the XML engine 46 to be described in detail below. The content connection handler 40 may communicate with a long-term database 48 (See FIG. 4) that is configured to store cookie information about the web sites from which page information is retrieved.

As described above, the content connection handler 40 functions as the interface with a content provider's website. In a preferred embodiment, it acts as a virtual browser, proxying browser functionality on behalf of the information appliance. This function is performed by an HTTP client connection module 90. The HTTP client connection module 90 functions to maintain a communication session with the content provider 13 and handle cookie and security (SSL) information. An HTML data processor 92 may render JavaScript data in a proxy fashion for the requesting information appliance 15. With a scripting language, such as JavaScript, the client-side source code is embedded directly into the HTML page and a client-side software plug-in that interprets that language is automatically activated while the HTML page is being displayed. This client-side software is not available on most information appliances, requiring our servers to proxy this function. An HTML cleanup module 94 may generate XHTML page information so that the translation server 12 can translate the received HTML page information to a format readable by and appropriate for an information appliance 15. Now, a method for intelligent harvesting in accordance with the invention will be described that includes some of the elements described above.

Figure 7:
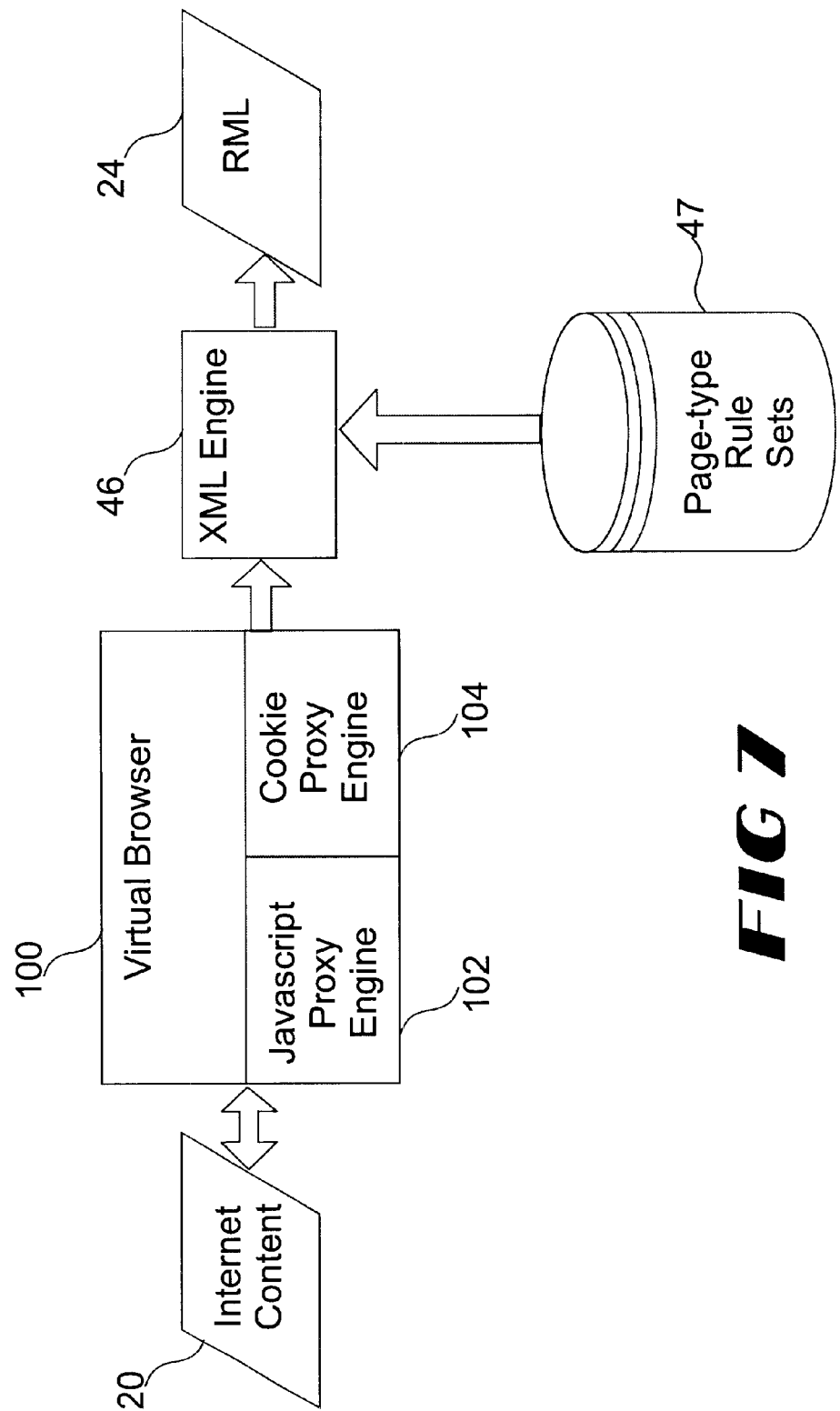
FIG. 7 is a diagram illustrating an intelligent harvesting method in accordance with the invention.

FIG. 7 is a diagram illustrating a method for intelligent harvesting of web pages in accordance with the invention that uses the elements shown in FIGS. 3 and 4. In particular, the content 20 is fed into a virtual browser 100 as described briefly above which passes on the content to the XML engine 46. Using the particular page-type rules sets stored in the database 47, the XML engine 46 may convert the content into relational markup language (RML) format 24. In more detail, a session on the Internet is handled by the virtual browser 100 located on the translation server 12. This virtual browser provides the important functionality of proxying javascript (using a Javascript proxy engine 102) and cookies (using a cookie proxy engine 104) for the target devices. For each page-type, an XSL rule-set is stored (See the W3C specification at http://www.w3.org/TR/2000/WD-xsl-20000112) in the database 47. This rule-set contains information about the division of content into atomics, content classification, and the relationships amongst these atomics for the particular page. The XML Engine 46 uses these XSL rule-sets to translate the HTML into RML. The division of content into atomics can be generated either automatically or by a producer using a tool set. The content classification information is used to determine what content and functionality are appropriate for which classes of devices. The content classification information may be generated either manually or automatically. Now, more details of the XML engine in accordance with the invention will be described.

Figure 8:
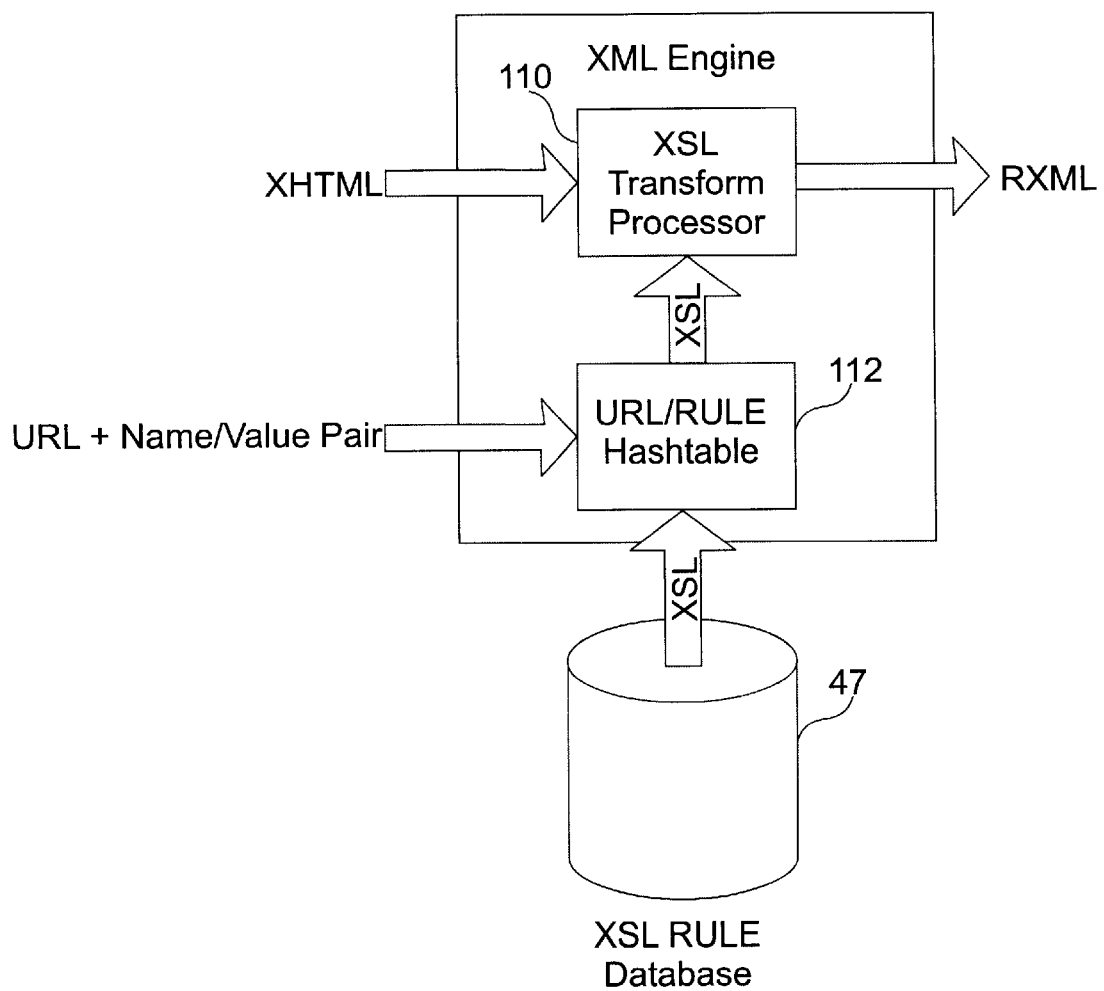
FIG. 8 is a diagrammatic view illustrating the XML engine of the translation server shown in FIG. 4.

FIG. 8 is a diagrammatic view illustrating more details of the XML engine 46. As described above, the XML engine 46 extracts content from dynamically changing XHTML information and generates a corresponding file, for example, an RML file, in accordance with predetermined rulesets. XSL rulesets define the transformation algorithms used to convert between formats, such as between XHTML and RML. An example of an XHTML document being converted into RML using an XSL rulesets is described below.

In operation, the XML engine 46 may receive a page-type designated by URL, name/value pairs, and cookie information and pages of XHTML information from the content connection handler 40. A URL/Rule hashtable module 112 may receive certain XSL rulesets from the database 47 that define how the information from the URL website is to be converted. Different XSL rulesets may be used depending on the format of the particular URL website from which original HTML page information has been received. In conjunction with the rulesets determined by the hashtable 112, an XSL transform processor 110 may convert the received XHTML, information to RML information that is provided to the layout engine 42 so that it can be converted into device and protocol specific mark-up language formats. Additionally, the XSL rulesets may permit the Internet content provider 13 to control the look and feel of the content (e.g., the location and/or inclusion of certain elements of the content together on a single card) regardless of the wireless device 15 on which the content is being displayed. Now, an example of an HTML page prior to conversion, an XSL ruleset that may be used to convert the particular HTML page and the resulting RML page in accordance with the invention will be described.

Below is an example of an HTML web page that may be converted in accordance with the invention into RML.

SAMPLE HTML CODE FOR WEB PAGE

```
<html>
    <head?
        <title>Welcome to Foo.com!</title>
    </head>
    <body>
        <p><a href="http://www.foo.com/login/">Log In</a></p>
        <p><a href="http://www.foo.com/signup/">sign Up</a></p>
        <h1 align="center">Foo.com</h1>
        <h4 align="center">Your source for all things foo!</h4>
        <table>
            <tr>
                <th colspan="2" align="center">Foo Products</th>
            </tr>
            <tr>
                <td>Foo Fighter</td>
                <td>$19.95</td>
            </tr>
            <tr>
                <td>Foo Peacemaker</td>
                <td>$29.95</td>
            </tr>
            <tr>
                <td colspan="2">
                    <a href="http:www.foo.com/buy">Buy these wonderful Foo's!</a>
                </td>
            </tr>
        </table>
        <p>(c) 2000 Foo.com</p>
    </body>
</html>
```

Now, a XSL ruleset that may be used to convert the above HTML page into RML in accordance with the invention is set forth below.

```
<xsl:stylesheet xmlns:xsl="http://www.w3.org/1999/XSL/Transform">
<xsl:template match="*|/"><xsl:apply-templates/></xsl:template>
<xsl:template match="text()|@*"><xsl:value-of select="."/></xsl:template>
<xsl:template match="html">
    <rml>
        <head>
            <title><xsl:value-of select="//title"/></title>
        </head>
        <guide>
            <navigation>
                <pane>
                    <xsl:for-each select="body/p/a">
                        <atomic name="Goto:" class="1" column="column">
                            <a href="{@href}"><xsl:value-of select="normalize-space(.)"/></a>
                        </atomic>
                    </xsl:for-each>
                </pane>
            </navigation>
        </guide>
```

-continued

```
                </pane>
            </navigation>
        </guide>
        <group name="Main" class="1" sequential="sequential">
            <xsl:apply-templates select="body"/>
        </group>
    </rml>
</xsl:template>
<xsl:template match="body">
    <atomic name="Title" class="1">
        <b><xsl:value-of select="h4"/></b>
    </atomic>
    <xsl:apply-templates select="table"/>
</xsl:template>
<xsl:template match="table">
    <group name="Toy Table" class="1">
        <atomic name="Table Title" class="1" sequential="sequential">
            <b><xsl:value-of select="tr/th"/></b>
        </atomic>
        <xsl:for-each select="tr[td[not(@colspan)]]">
            <group name="Toy" class="1">
                <xsl:for-each select="td">
                    <atomic name="Entry">
                        <xsl:value-of select="."/>
                    </atomic>
                </xsl:for-each>
            </group>
        </xsl:for-each>
    </group>
</xsl:template>
</xsl:stylesheet>
```

The resulting RML code in accordance with the invention is set forth below:

```
<!DOCTYPE html PUBLIC "-//W3C//DTD HTML 4.0 Transitional//EN">
<rml>
    <head>
        <title>Welcome to Foo.com!</title>
    </head>
    <guide>
        <navigation>
            <pane>
                <atomic name="Goto:" class="1" column="column">
                    <a href="http://www.foo.com/login/">Log In</a>
                </atomic>
                <atomic name="Goto:" class="1" column="column">
                    <a href="http://www.foo.com/signup/">Sign Up</a>
                </atomic>
            </pane>
        </navigation>
    </guide>
    <group name="Main" class="1" sequential="sequential">
        <atomic name="Title" class="1">
            <b>Your source for all things foo!</b>
        </atomic>
        <group name="Toy Table" class="1">
            <atomic name="Table Title" class="1" sequential="sequential">
                <b>Foo Products</b>
            </atomic>
            <group name="Toy Table" class="1">
                <atomic name="Entry">Foo Fighter</atomic>
                <atomic name="Entry">$19.95</atomic>
            </group>
            <group name="Toy" class="1">
                <atomic name="Entry">Foo Peacemaker</atomic>
                <atomic name="Entry">$29.95</atomic>
            </group>
        </group>
    </group>
</rml>
```

The above RML code may also include the unstructured tag as described above that m surrounds a particular portion of the mark up language that is unstructured and may be processed using a perl script. Now, a graphical example of HTML content being converted into the RML in accordance with the invention will be described.

Figure 9A:
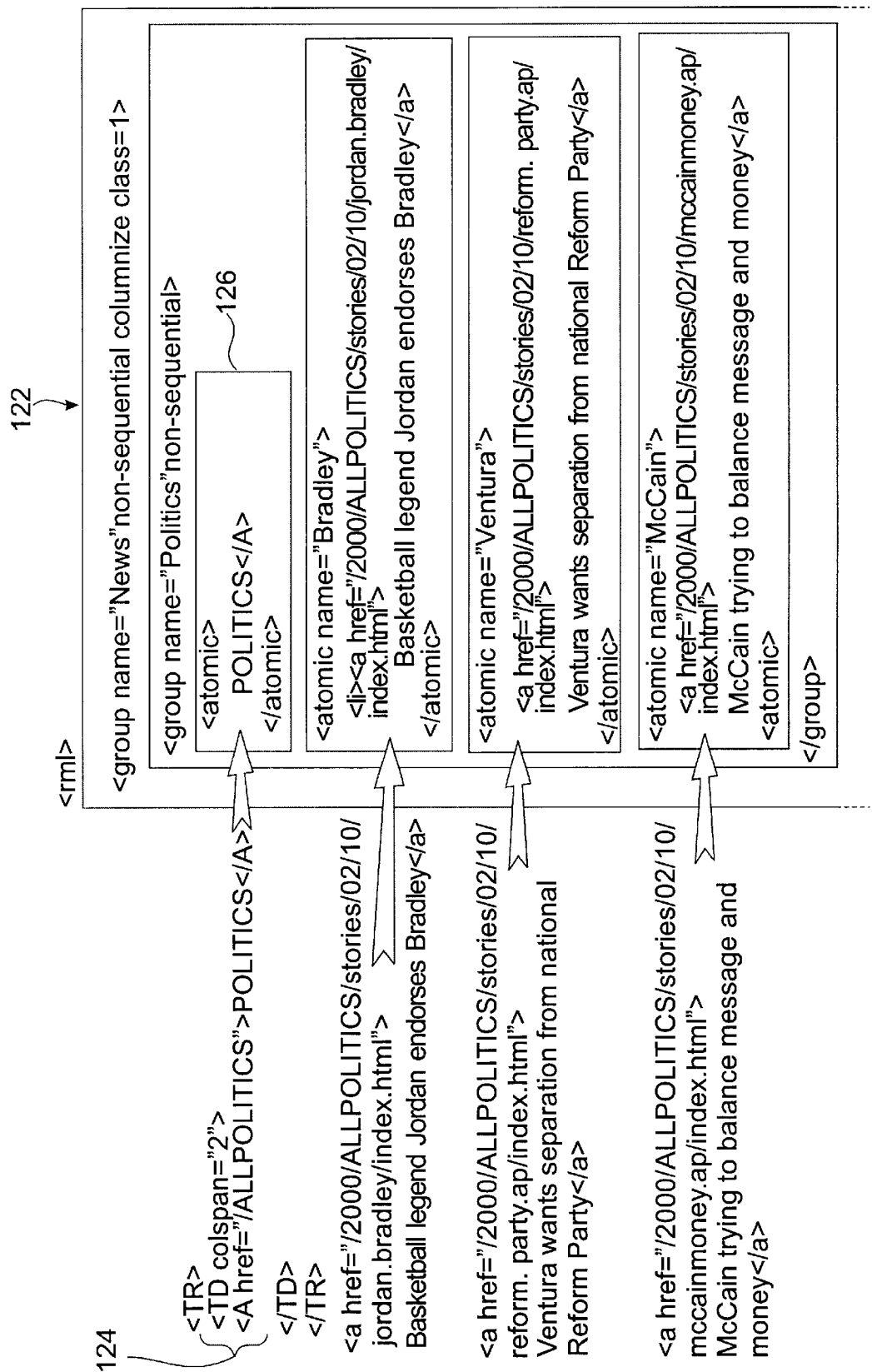
FIG. 9 illustrates an example of the mapping of an HTML web page into an RML object in accordance with the invention.
Figure 9B:
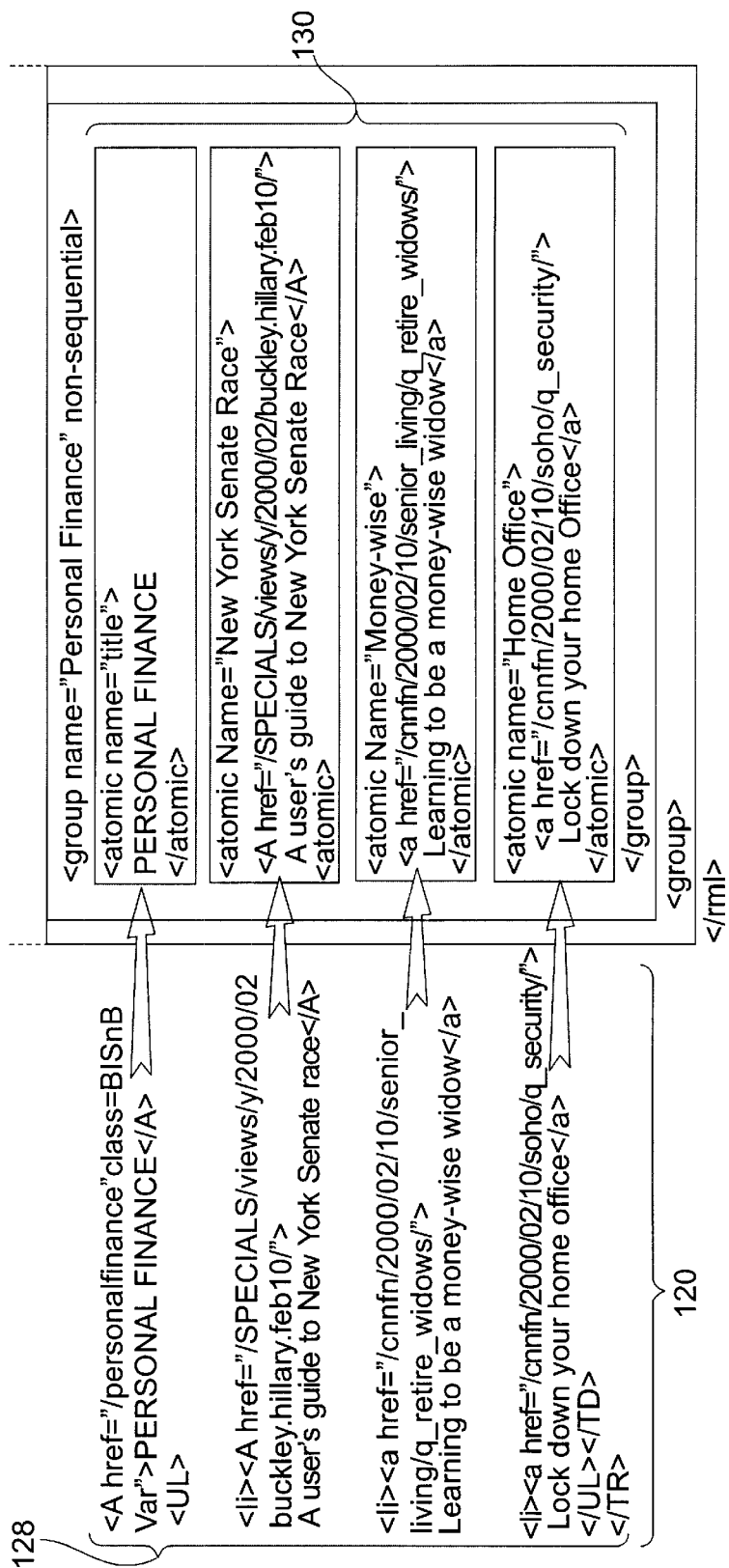

FIG. 9 is a diagram illustrating an HTML page 120 being converted into an RML page 122 in accordance with the invention. For purposes of the conversion, each piece of discrete content with presentation structure or no structure 124 is mapped into an atomic 126 in the RML code. It should be noted that the hyperlinks within a piece of content are maintained in the atomics. In addition to the atomics, groups of content 128 in the HTML page may be converted into a group 130 in RML. In this example, the group is non-sequential (e.g., the content in the group does not need to be displayed sequentially). Now, an example of the division of a graphical web page into atomics and groups in accordance with the invention and the layout engine 42 will be described in more detail.

Figure 10:
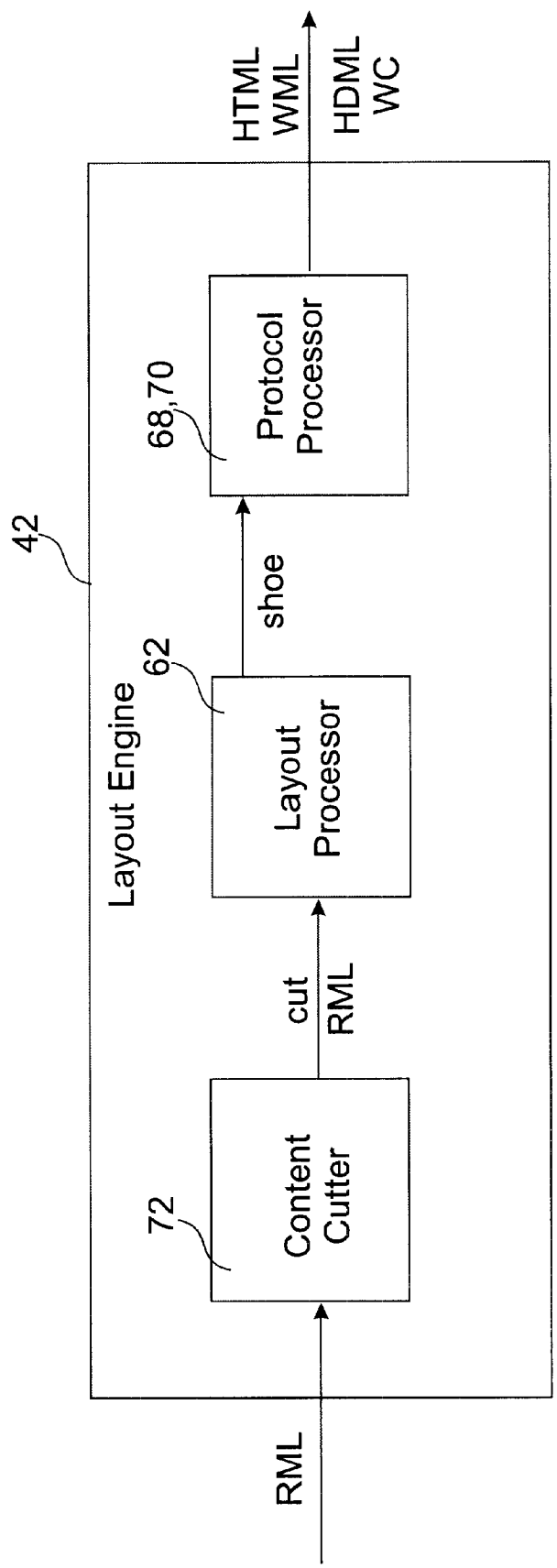
FIG. 10 is a diagrammatic view of the layout engine of the translation server shown in FIG. 4.

FIG. 10 is a diagram of the layout engine 42 in accordance with the invention. As described above, the layout engine 42 formats a content source for a specific device's screen and inherent capabilities. The layout engine 42 may include the content cutter 72, the layout processor 62, the card builder 68, and the deck builder 70. The content cutter 72 cuts all the content of format and content classes not appropriate for the specific device from the received HTML page to create an XML representation of the received original webpage. The layout processor 62, using prior knowledge of the device type and the content, dynamically devises an optimal layout and navigation structure for the particular device 15. Thus, the output of the layout engine 42 is a presentation shoe in the appropriate presentation protocol for a particular appliance 15.

Presentation shoes are built from the bottom-up, resulting in the highest priority "atomic" being placed on a card first. An atomic is the smallest unit of a web page that encapsulates an idea. For example, an atomic may be a paragraph of text, a heading, a link to a news story, a picture, etc. Atomics may be grouped together to reveal relationships between them. Groups may be nested to form a complex relational hierarchy. These groups can be placed on cards so that customized presentation pages can be transmitted to a device 15.

In operation, an RML document is received by the layout engine 42 from which the content cutter 72 cuts data classes that are not appropriate for the requesting device 15 to generate an XML document containing the cut content, device information that specifies the target device, and protocol information that specifies the target protocol.

Figure 11A:
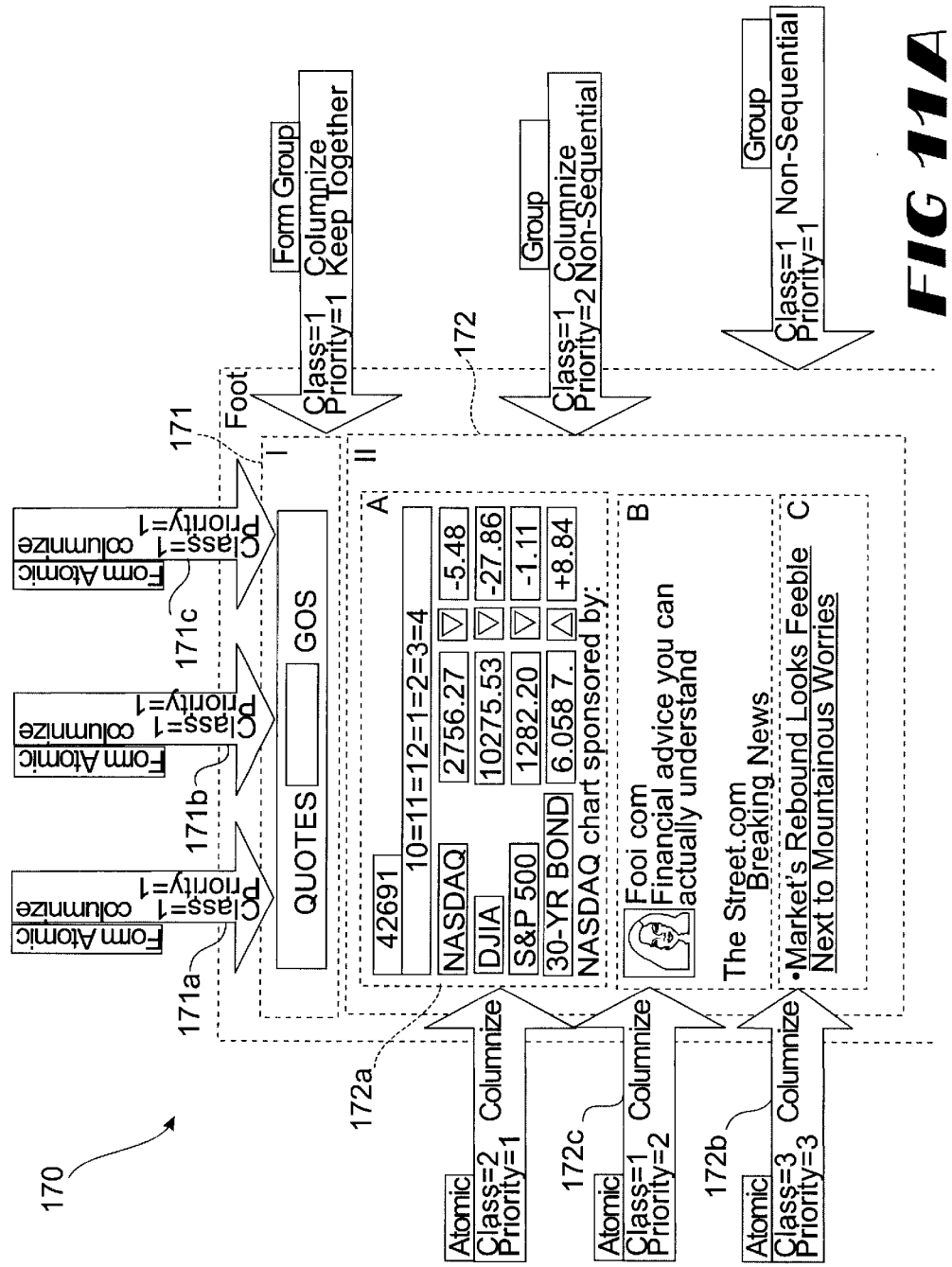
FIG. 11 illustrates an example of a portion of an HTML-based web page from the E-TRADE website illustrating the grouping of different elements of the web page in accordance with the invention.
Figure 11B:
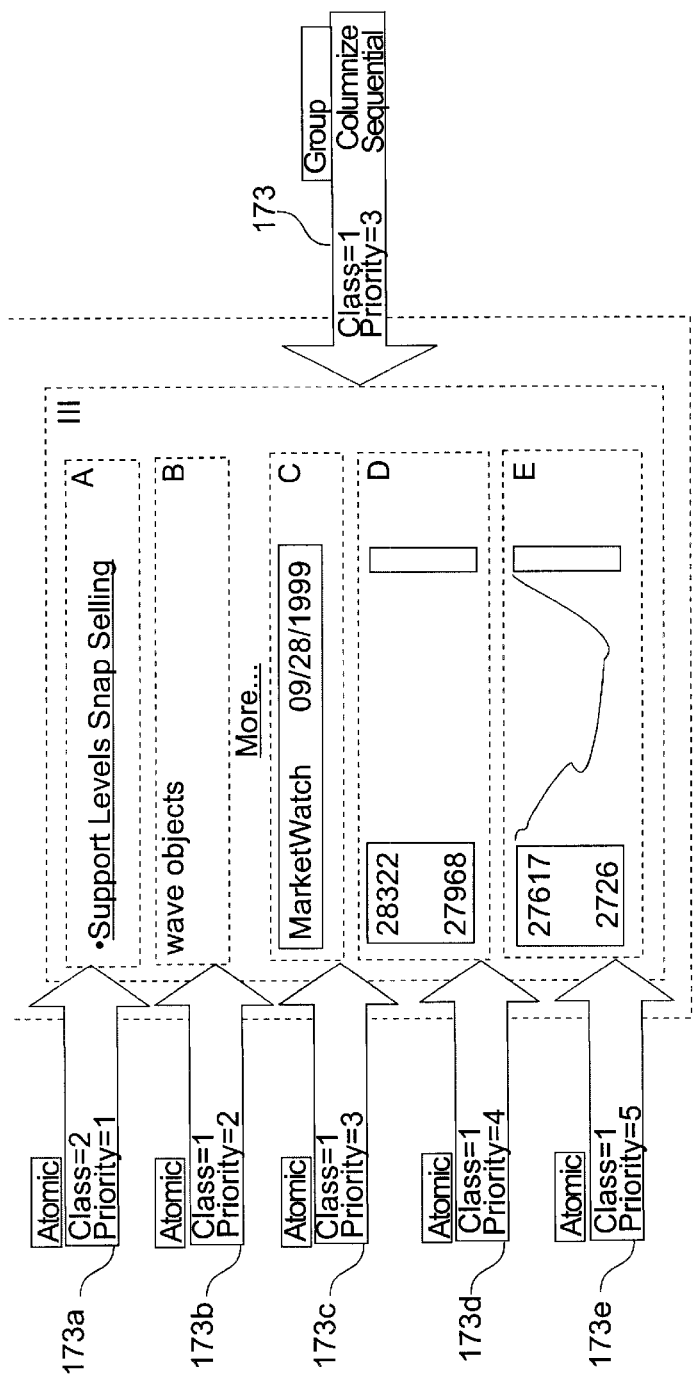

Card creation will be described with reference to FIGS. 11–13. An example of a portion of an HTML web page 170 from the E-TRADE website is shown in FIG. 11. In the Figure, the innermost dashed boxes designate atomics while the boxes enclosing them constitute groups. At the top portion of the page 170 is a quote look-up form 171. The quote look-up form 171 is made up of three atomics, a "Quotes" title portion 171a, an entry box 171b and a "Go" submission button 171c. Further, the market graph 172a, table 172b, and Fool.com advertisement 172c are each related atomics and are grouped together to constitute group 172. In addition, each element in the market graph 172a may also be an atomic so that "NASDAQ" is an atomic, "2756.27" is an atomic, the down arrow is an atomic and "–5.48" is an atomic. Finally, the TheStreet.com logo 173a, and the four news stories 173b–e are each related atomics and are grouped together as group 173. All of the groups 171, 172, 173 make up the root group 170. These groups constitute the relational hierarchy for this portion of the E-TRADE website.

To display this website on a display device 15, such as a Palm Pilot or a Windows CE device, the groups and atomics need to be organized and placed on cards that make up the presentation shoe. Cards are created by examining how groups best fit onto the cards. A tree data structure can be generated from the RML object. As described above, nesting groups describe the relational context of content contained in a webpage. In RML formatting, each group typically has three primary attributes: name, class and priority. The name attribute is used during a navigation pass through the tree as a link description to the group if needed. The class attribute is used by the content cutter 72 to determine the content in the webpage that is appropriate for a specific device's capabilities. Thus, the class attribute allows different levels of content to be presented to different classes of devices. For example, the general classes of devices are shown in the following table, but the number of classes may be increased or decreased.

| Class | General Device Class |
|---|---|
| 1 | Cellular telephones - very limited screen size |
| 2 | Palm Pilot - low resolution, black and white or monochrome display |
| 3 | Windows CE - high resolution, color display |

The priority attribute indicates the importance of each portion of the content and is used by the layout generator 42 during preprocessing to order the content into appropriate groups. To further organize the groups, each group also has Boolean attributes, such as columnize, sequential and other attributed such as association. The association attribute may have the values of keep together (keep the atomics together), isolate (isolate the atomic on its own card) or null. The columnize attribute indicates whether an atomic/group should be placed adjacent another atomic/group on a card. The sequential attribute specifies how the navigation structure should be designed. For example, atomics containing paragraphs of a story would be grouped as sequential information. In contrast, a list of links to news stories would be grouped as non-sequential information. The keep together attribute indicates to the layout engine 42 to keep children of a node together on the same card if possible. The isolate attribute specifies that the group is be placed onto its own card.

In addition to the above, knowledge of the number of characters and pixels horizontally and vertically on the target wireless device 15 is desirable. In addition, for devices 15 that allow fonts, a font width calculation may need to be made. A bandwidth and screen dependent variable may be assigned to determine how much content is allowed to scroll before a new presentation page is created vertically and a link created to subsequent presentation pages. Another variable may store the minimum container width (how narrow the text container can be made so that another container can be put along side it).

Figure 12:
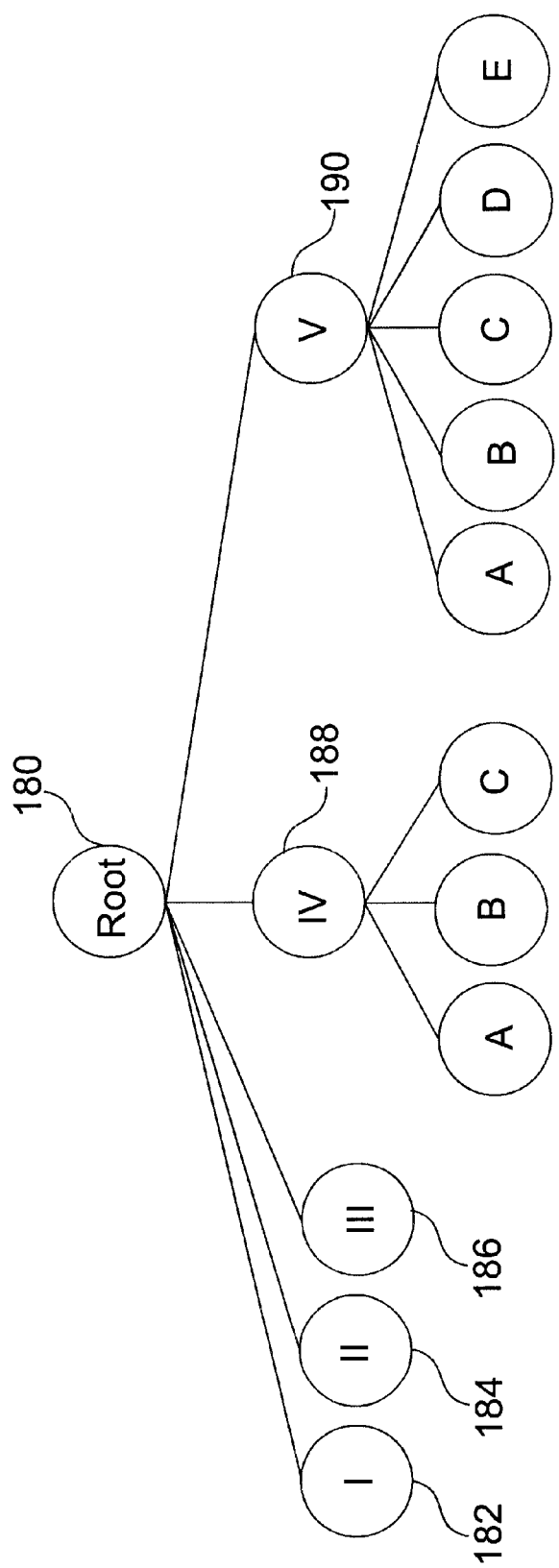
FIG. 12 is a diagrammatic view of a data structure tree for ordering the different groups and atomics of the E-TRADE web page shown in FIG. 11.

FIG. 12 illustrates the relational structure of the groups in the E-TRADE web page shown in FIG. 11 that may be represented in a tree structure. This separation of content from style in a relational way that can be represented in a tree allows for the re-formatting of the content in accordance with the invention. In the Figure, a root element node 180 refers to the outermost group of the tree and indicates the E-TRADE web page 170. The nodes 182–186 (roman numerals I, II, and III) are the "children" of the root node and refer to the atomics 171a, 171b, 171c of the Quotes portion 171 of the E-TRADE web page 170. A node 188 (roman numeral IV), another child of the root node, refers to the market group 172 and includes children nodes A–C (market graph 172a, table 172b and Fool.com advertisement 172c of FIG. 11). Similarly, a node 190 (roman numeral V) refers to the news section 173 and includes children nodes A–E (the news story links 173a–e of FIG. 11). The flexibility of trees and directed graphs allows them to represent any structure found in a web site. Thus, the trees provide a method to organize the complicated relationships amongst content in a web page for formatting as well as provide navigation links between cards in a presentation shoe.

To provide a simple tree structure that can be efficiently navigated, the tree is sorted by priority. This pre-processing reorders the tree to put the content that will appear on the device 15 first in the left-most nodes of the tree. After the tree has been sorted, the groups and content are evaluated in order to assign the content to one or more cards using the attributes described above. A depth-first search algorithm as described above, using a recursion technique that considers outgoing edges of a vertex before any neighbors of the vertex, may be used to implement this evaluation as described below with reference to FIG. 13. As this search evaluates each vertex, it attempts to optimally fit the atomics onto cards.

Figure 13:
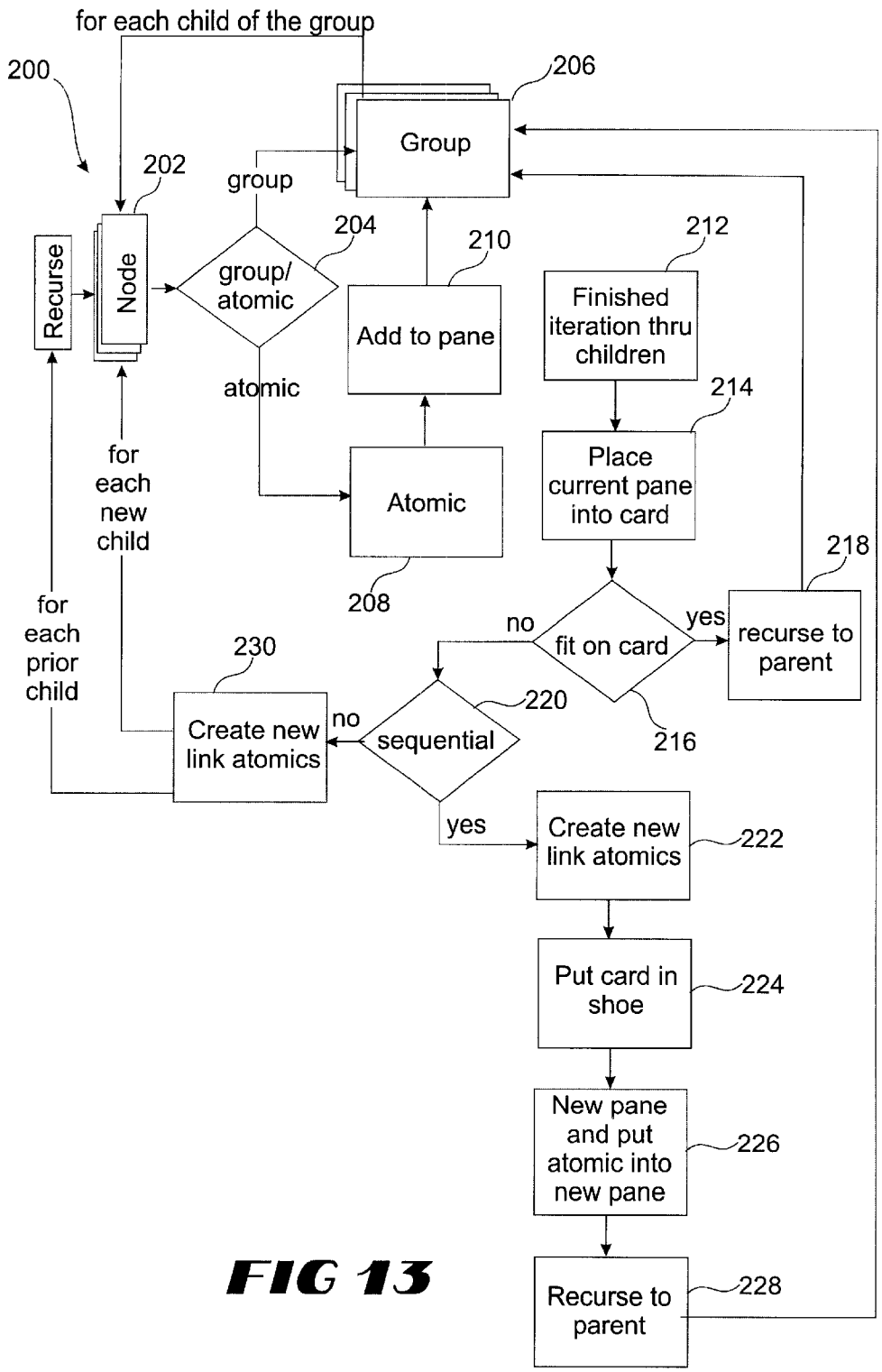
FIG. 13 is a diagram illustrating a recursive tree analysis in accordance with a preferred embodiment of the invention.

FIG. 13 is a flowchart illustrating a method 200 for recursing through the tree generated by the XML engine in order to generate customized panes and cards that may be displayed on an information appliance or wireless device 15 in accordance with the invention. The recursive method starts with the root node—the top node in the tree (See FIG. 12). In this case, the root node is the top-level group node that encompasses all of the content that shall be placed into cards. The goal of the recursion is to place content into cards in such a manner that the context of the content remains while creating an intelligent manner of accessing the content (an intelligent navigation scheme) for each different information appliance or wireless device that may have different display capabilities. As described above, all of the content resides in atomic nodes and all atomic nodes are children of groups. An example of the groups and atomics are illustrated in FIG. 11. Groups can contain other groups or atomics while atomics can only contain content, for example, HTML.

FIG. 13 is an example of how the recursion method may be accomplished but many other implementations are possible. Recursion through the tree representation of the web site begins at the root node. The depth-first search proceeds to the first node without any children. This is the first atomic having the highest priority. In addition to the previously described attributes, two additional attributes are relevant to the creation of cards that are placed in the presentation shoe., "panes" and "frames." Multiple atomics can be placed, top to bottom, into a pane. Panes can be assigned to cards adjacently (columnized) by placing them into two frames side-by-side on the card.

The recursion for the tree starts by passing the root node to the Recurse node object 202 which determines what kind of node (e.g., a group or an atomic) is being manipulated in step 204. In the root node's case, the passed node is a group and it is passed to the Recurse Group object 206. The Recurse Group object iterates through the node's children, passing each of them back to Recurse Node 202. In the case where the node Recurse Node receives an atomic, the node is passed to Recurse Atomic step 208. In Recurse Atomic, an atomic object is created using the node's contents. This Atomic is then placed on to the current pane in step 210.

There are certain circumstances, such as columnizable atomics, where the current pane is added to the card and the current atomic is placed in a new pane. A columnizable atomic is one that can be placed adjacent to another atomic. When all of the children of a group have been passed to Recurse Node in step 212, Recurse Group 206 then tries to add the current pane to the current card in step 214. If the pane fits on the card (the test occurs in step 216), then Recurse Group returns in step 218 to Recurse Group 206 and the recursion continues. If the pane doesn't fit on the card, an exception is handled in Recurse Group where one of two things can happen. If the pane contains sequential atomics (as tested in step 220), then the pane is split, and as many of its atomics that can fit on the current card are placed into a new pane and put onto the card (steps 222. A link to the next card is placed at the end of the full card and then the card is placed in the shoe and a new card is created 224. The new pane with the remaining cards is put onto the new card in step 226 and the recursion continues in step 228.

If the pane contains nonsequential atomics (as tested in step 220), then the current node is cloned (duplicated). Then, sequential atomic nodes that are links to the original children are created in step 230 and added as children to the original node while the original children are removed. The cloned node contains the original children. The Recurse Group step 206 then iterates through these original children by passing them to the Recurse Node object 202. If no exceptions occur, Recurse Group 206 then iterates through the original node's new children. This iteration is handled in the same manner as the original iteration through the group's children. Once all of the atomics have been placed in panes and these panes placed in cards, the recursion should return to the root node and the recursion ends.

Figure 14:
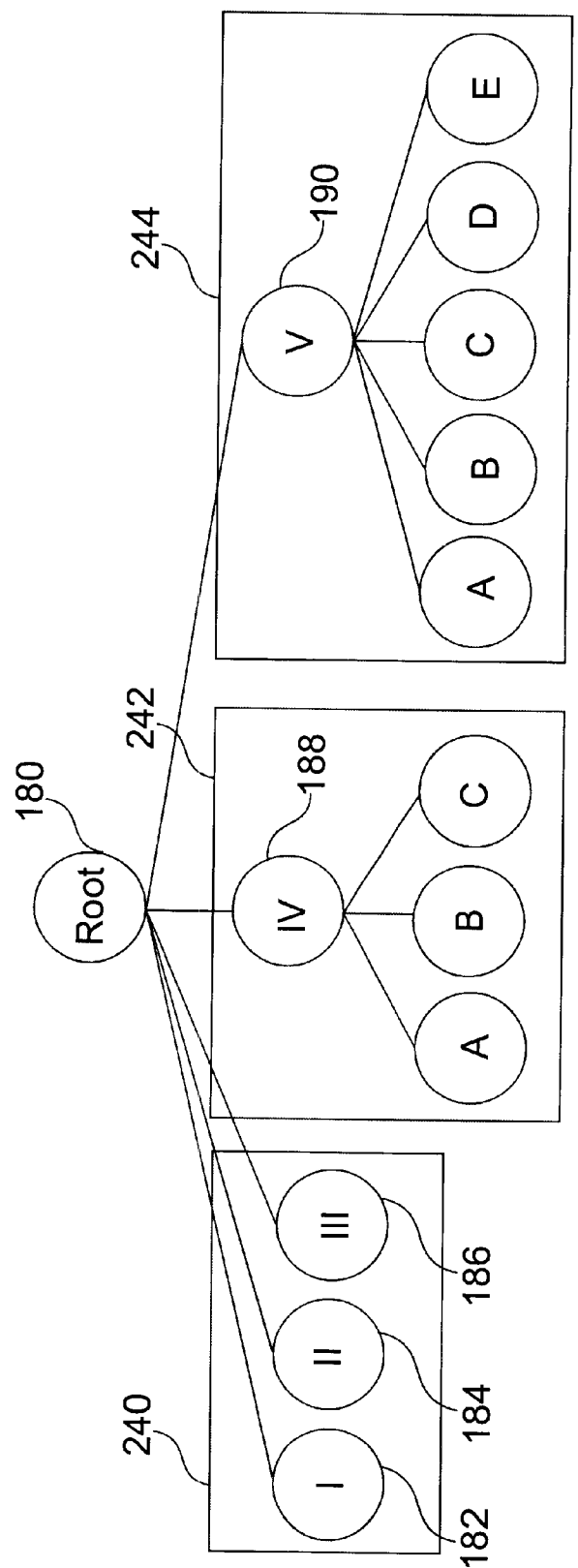
FIG. 14 is a diagrammatic view of the tree structure shown in FIG. 12 illustrating a collapsing methodology for processing the tree in order to create cards in accordance with the invention.

FIG. 14 illustrates a collapsing methodology for processing the tree to create cards that can be transmitted to a device 15. The recursion of the tree as described above begins at the root node and proceeds to its first child node 182 (node I), the "Quotes" text 171a. A new columnizable pane is created and atomic I (171a in FIG. 11) is added to it. This pane, as it is closed, is added to a newly created card. The recursion process then continues to the next node 184 (node II), the entry box 171b, and adds this atomic to a new columnizable pane. Similarly, node III, the "Go" submission button 171c, is added to a new columnizable pane. These panes are passed back to the root node and a card 240 is created that includes the three panes.

The recursion process continues to node 188 (node IV), the market group 172, and immediately to leaf node A, the market graph 172a. A new pane is opened and atomic A is added to it. The process continues to leaf node B, the market table 172b. Atomic B is added to the pane, as is atomic C, according to the same processing, and the recursive process continues through the tree to node 190 (node V), the "News" section 173. A new card 242 is created that includes atomics A–C of group IV. Similarly, atomics A–E (news stories 173a–e of FIG. 11) are placed on a third card 80c and the recursive process completes.

Figure 15:
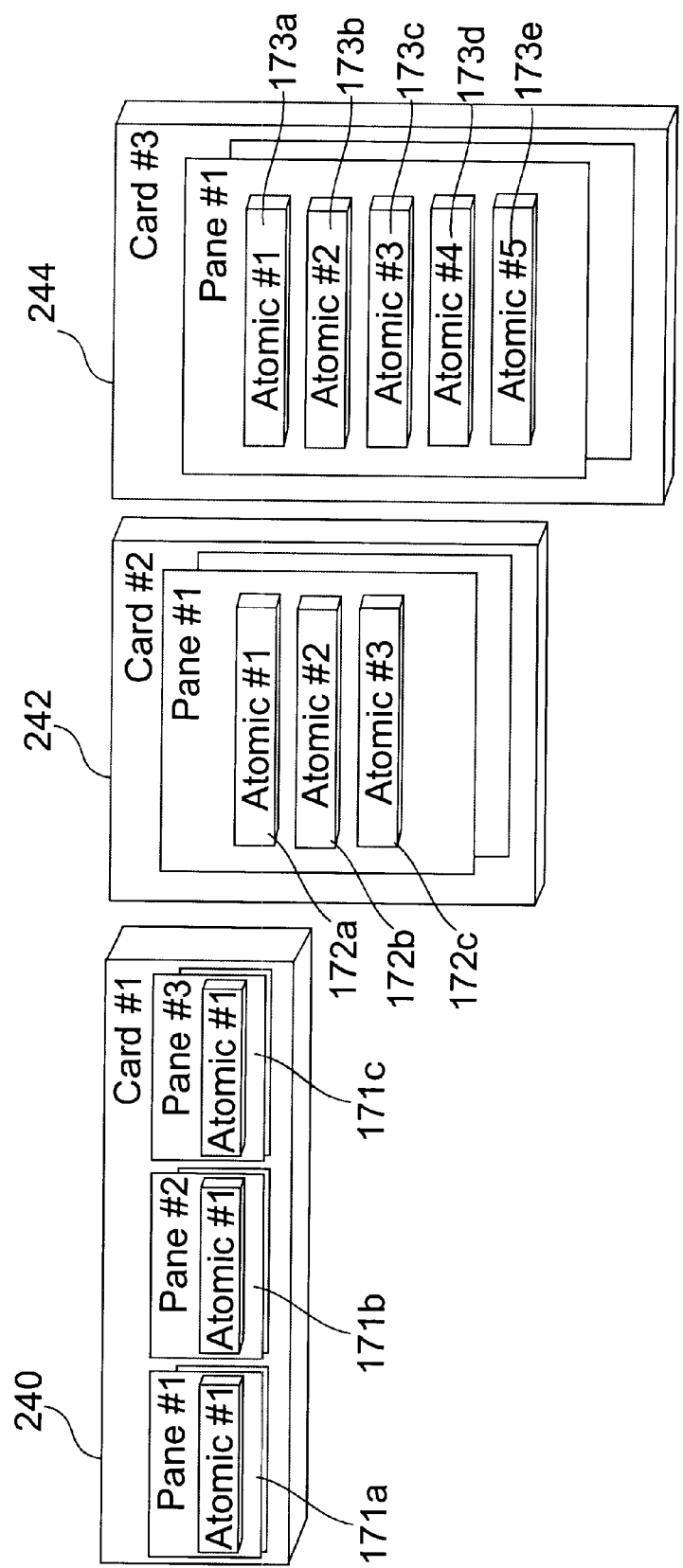
FIG. 15 is a diagrammatic view illustrating an example of card formats that are created in processing the tree structure shown in FIG. 12.

The output of the card generation is shown in FIG. 15. Each of the cards 240, 242, 244 is shown. As shown in the Figure, the first card 240 includes atomics 171a, 171b, 171c from FIG. 11 wherein each atomic is in an individual pane. The second card 242 includes atomics 172a, 172b, 172c from FIG. 11 all grouped as a single pane on the card 242.

The third card 244 includes atomics 173a–e grouped as a single pane. Whether atomics may be grouped on a card as a single pane or in individual panes or any combination thereof depends primarily on the contextual information relating to the atomic.

Navigation amongst these cards is determined by the sequential attribute of the root node. Thus, in the non-sequential case, a card with links to the three cards 240–244 shown in FIG. 15 would be created. In contrast, for a sequential case, navigation between the cards 240–244 would begin at the first card 240 and links at the bottom of the first and second cards 240, 242 would lead to the next successive card (e.g., the second card 242 and the third card 244) respectively. As mentioned above, the navigation between cards can be determined from the tree.

The recursive process described above was simplified because each child of the root node fit on am individual page. The following description, with reference to FIGS. 16–18, illustrates a more complicated card creation process in which the dynamic feature of the layout engine 42 are shown.

Figure 16:
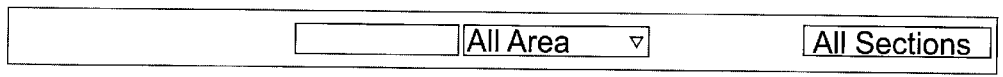
FIG. 16 is an example of a portion of an HTML-based web page from the CitySearch.com website illustrating the grouping of different elements of the web page in accordance with the invention.

FIG. 16 illustrates an example of a web page 290 from the CitySearch.com website. In the Figure, two different groupings are indicated. The first grouping 291 includes the "Review of the Week" contextual information. In the group 291, four atomics 291a–d are shown that reference the title 291a, text 291b, picture 291c and mini review 291d. The second grouping 292 includes the "New Releases" contextual information. In the group 292, there are different numbers of atomics for different sub-groups. Each of the subgroups 293–296 are grouped according to the different movies. Atomics within these subgroups represent the names 293a, 294a, 295a, 296a of the movies, pictures 293b, 294b, 295b, 296b of the movies and mini reviews 293c, 294c, 295c, 296c of the movies. Sub-group 293 also includes another atomic 293d referring to the title "New Releases." These groups and sub-groups constitute the relational hierarchy for this portion of the CitySearch.com website as determined by the XML engine 46 in accordance with the invention using the XSL rule set and perl script for the particular web page.

Figure 17:
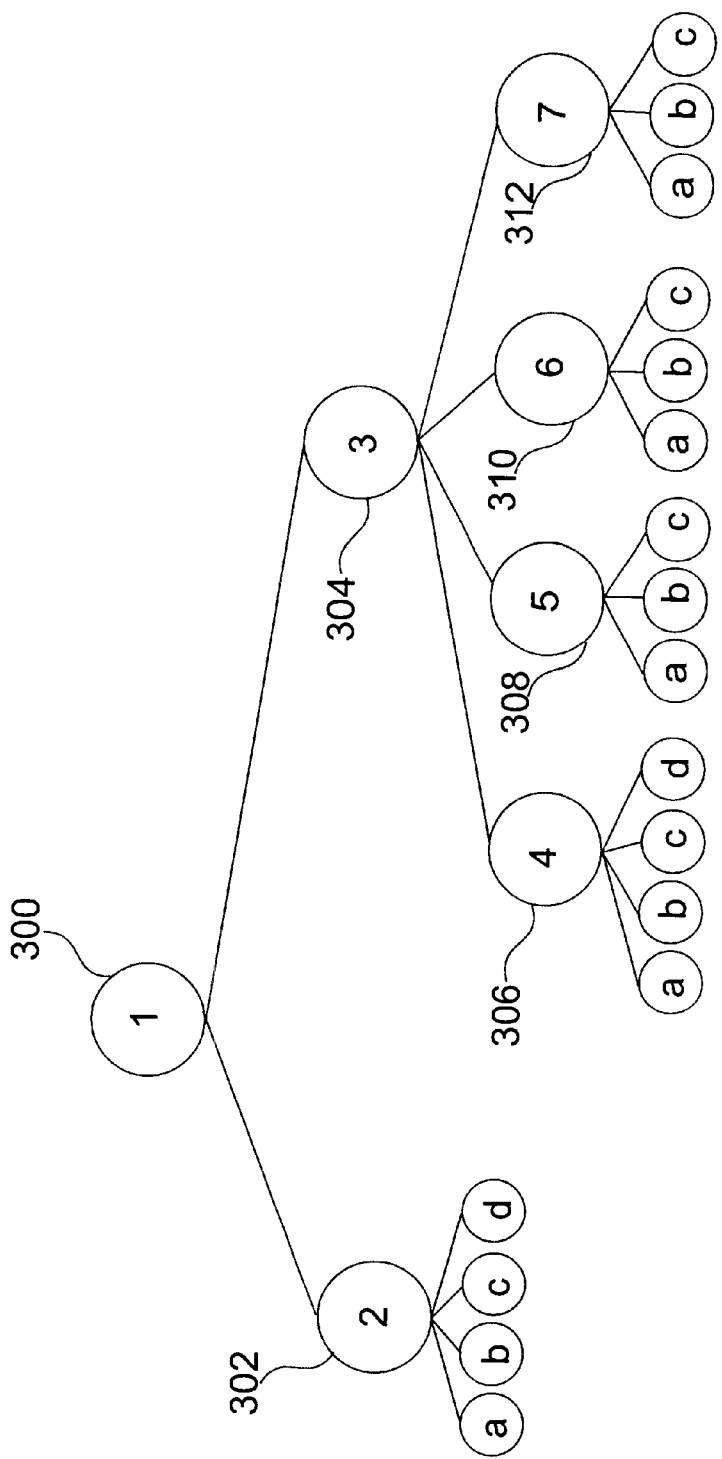
FIG. 17 is a diagrammatic view of a data structure tree for ordering the different groupings and atomics of the CitySearch.com web page shown in FIG. 16.

The tree structure for the CitySearch.com web page 290 is illustrated in FIG. 17. In the Figure, the root node 300 ("1") indicates the CitySearch.com website group. Child nodes 302, 304 (Nodes 2 and 3) indicate the two groups "Review of the Week" 291 and "New Releases" 292. The atomics a–d of node 2 refer to the title 291a, text 291b, picture 291c and mini review 291d of the "Review of the Week" group 291 of FIG. 16. The child nodes 306–312 of node 3 (nodes 4–7) and their associated atomics a–c of the tree represent the different movie sub-groups 293–296 included in the "New Releases" group 292.

In accordance with the invention, the layout engine 42 recursively iterates through the relational tree structure, dynamically building cards for an appropriate screen size of a target device 15. As described above, the recursive process may incorporate a depth-first recursive algorithm to implement processing of the tree structure. For example, recursion begins at node 1, the root node of the tree and proceeds to node 2, the "Review of the Week" group 291, to search for the highest priority node that does not have any associated children. The process continues to node 2a, the title portion 291a of the group 291. Atomic 2a is placed onto a pane and the pane state is set to non columnizable. Next, the recursion process proceeds to node 2b, the text portion 291b of the group 291. The atomic state of the text portion 291b is compatible with that of the title portion 291a so the atomic 291b is added to the current pane. This process continues, as described above, until the entire tree has been processed and the atomics have been placed in panes on cards.

Figure 18A:
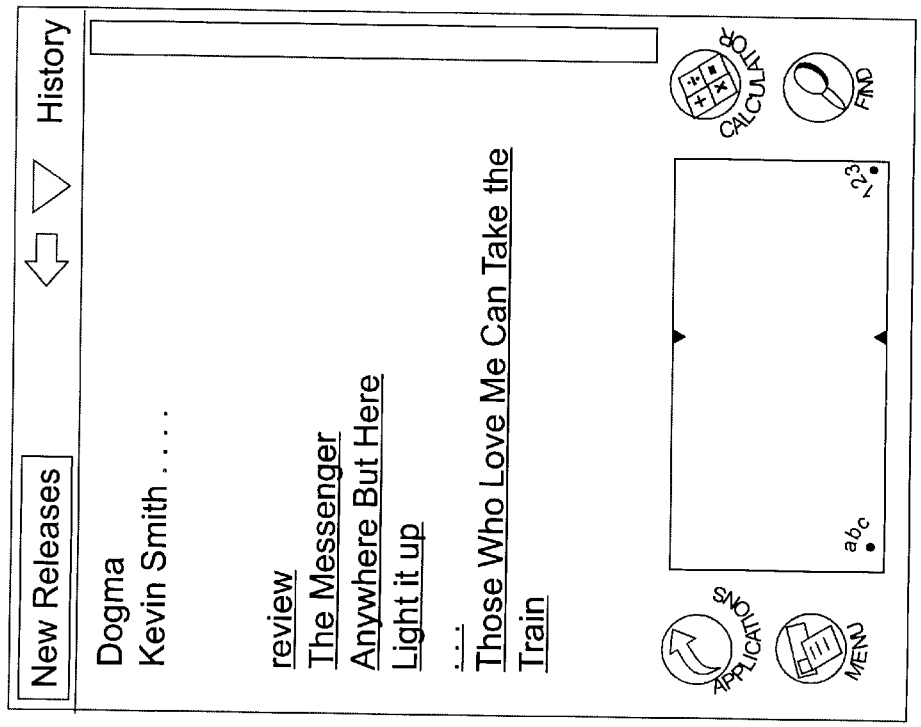
FIG. 18A is an example of a screen shot of a Palm Pilot device showing a presentation page of the CitySearch.com website shown in FIG. 16.

Depending on the target device 15 screen size capability, different presentation screens may need to be generated by the system 10 so that the information may be viewed on the device 15. For example, for a Palm Pilot device, the contextual information associated with node 2, the "Review of the Week" group 291, may fit entirely on the display screen so that the associated atomics may be included on a single card. However, the "New Releases" group 292 and its associated subgroups 293–296 may not fit on the card and new cards may need to be created in order to display this information on the Palm Pilot. Since node 3, the "New Releases" group 292, is a non-sequential group, new cards for each of the subgroups 293–296 may be created and the appropriate links may be inserted into the cards so that a viewer of the information on the device can navigate between display pages. An example of the presentation information of the CitySearch.com web page 290 shown on a Palm Pilot device is shown in FIG. 18A.

Figure 18B:
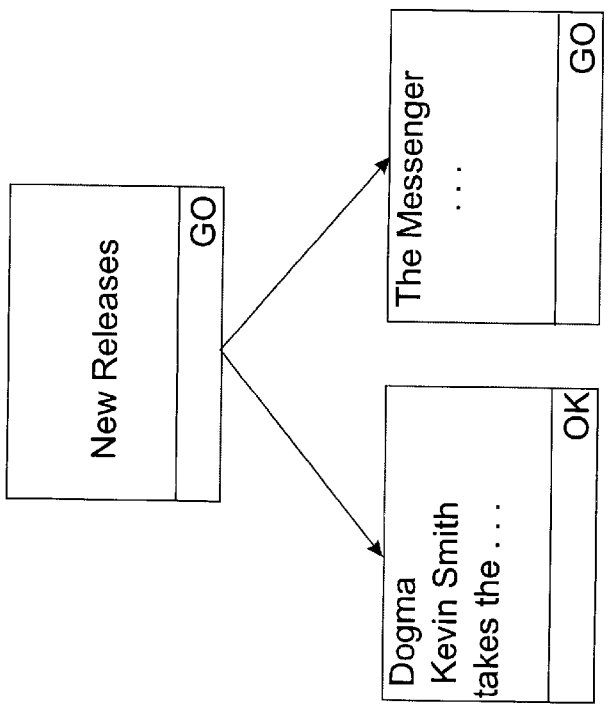
FIG. 18B is an example of a series of screen shots of a cellular telephone device showing a presentation page of the CitySearch.com website shown in FIG. 16.

In contrast. for a cellular telephone device that has a limited display screen size, a different alternative of displaying presentation information is possible and automatically generated by the system. In particular, depending on the size of the display screen, the system 10 may determine that cards are divided at different points along the creation process and the appropriate links inserted thereon so that a viewer of the presentation information on the phone device can navigate between the different display pages. FIG. 18B shows an example of the presentation information of the CitySearch.com web page 290 shown on a cellular telephone device. In particular, the information displayed on the full screen display of the Palm Pilot (See FIG. 18A) are broken into one or more smaller screens wherein, for example, the user of the phone must select the "Go" button to move down through the various titles of the movies that are reviewed.

While the foregoing has been with reference to a particular embodiment of the invention, it will be appreciated by those skilled in the art that changes in this embodiment may be made without departing from the principles and spirit of the invention and defined by the appended claims.

What is claimed is:

1. A system for intelligently harvesting information from a data source for one or more different information appliances having different input/output formatting capabilities, comprising:

means for receiving web-based content information of a first input/output format;

means for translating the received content information from the first input/output format to a different input/output format that is recognizable by a specific device; and means for providing the translated content information to the device.

2. The system of claim 1 wherein the device is a wireless device having a predetermined display screen size.

3. The system of claim 1 further comprising means for receiving information from a device that indicates the input/output format of the device so that the translated content is generated based on the input/output format of the device.

4. A system for translating content information from a first formatting language to a second formatting language, comprising:

a host system including content information of a first formatting language;

a translation server remotely connected with the host system, the translation server configured to receive the content information of a first formatting language and translate the received content information from the first formatting language to a second formatting language; and a device remotely connected with the translation server, the device configured to receive the content information of the second formatting language and display the content information.

5. The system of claim 4, wherein the device is a wireless device having a predetermined display screen size.

6. The system of claim 4, wherein the host system comprises an Internet web server that includes at least one web page thereon, the web page having a specific URL Internet address and including the content information of the first formatting language.

7. The system of claim 4, wherein the translation server comprises means for establishing a communications session with the host system so that information content of the first formatting language can be received by the translation server; means for receiving the information content of the first formatting language; means for converting the information content of the first formatting language to information content of an intermediate formatting language recognized by the translation server; means for translating the information content of the intermediate formatting language to information content information of the second formatting language; means for formatting the content information of the second formatting language so that the content information can be transmitted to and displayed on the device.

8. The system of claim 7 wherein the information content of the first formatting language comprises HTML.

9. The system of claim 7, wherein the intermediate formatting language is XHTML.

10. The system of claim 7, wherein the translation means comprises an XML engine.

11. The system of claim 10, wherein the XML engine comprises a hashtable module for comparing the URL Internet address of the received content information with a group of predetermined rulesets that define a criteria for translating the content information to the second formatting language; and a transform processor configured to convert the received content information of the intermediate formatting language to content information of a second intermediate formatting language.

12. The system of claim 11, wherein the second intermediate formatting language comprises RML.

13. The system of claim 11, wherein the group of predetermined rulesets define a branding criteria for the content information of the second formatting language so that the content information of the second formatting language displayed on the device is similar in appearance to that of the content information of the first formatting language received from the webpage.

14. The system of claim 13, wherein the group of predetermined rulesets comprise XSL rulesets defined by the host system.

15. The system of claim 7, wherein the formatting means comprises a layout engine.

16. The system of claim 15, wherein the layout engine comprises a content cutter for extracting portions of the content information of the second intermediate language that are not compatible with a display capability of the device so that the content information of the second formatting language can be generated from the remaining content information of the second intermediate language; a layout processor for dynamically generating a layout format for the content information of the second formatting language that is optimized for the display screen size of the device; and a protocol processor for generating the content information of the second formatting language.

17. The system of claim 16, wherein the layout format comprises a presentation shoe that includes at least one presentation card, each presentation card representing a display page of the device, each presentation card including at least a portion of the content information of the second formatting language, wherein subsequent presentation cards in the presentation shoe are linked so that the content information of the second formatting language can be selectively viewed on the device.

18. The system of claim 17, wherein the presentation cards include at least one pane portion thereon and wherein the content information is separated into atomic groups of content information, the atomic groups of content information being organized and assigned to the pane portions of the presentation card so that formatting of the content information can be optimized for the display screen on the device.

19. The system of claim 18, wherein the presentation cards in the presentation shoe are transmitted to the device so that the content information of the second formatting language can be displayed on the device.

20. The system of claim 7, wherein the device formatting means further comprises means for receiving information from a device that indicates the input/output format of the device and means for formatting the content information of the second formatting language based on the received device information.

21. The system of claim 4, wherein the translation server further comprises a content connection handler.

22. The system of claim 21, wherein the content connection handler comprises a client connection module configured to establish and maintain a communications session with the host system; a data processor configured to receive the content information of the first formatting language from the host system, a cleanup module configured to convert the content information of the first formatting language to content information of the intermediate formatting language; means for translating the information content of the intermediate formatting language to information content information of the second formatting language; and means for formatting the content information of the second formatting language so that the content information can be transmitted to and displayed on the device.

23. A method for intelligently harvesting information from a data source for one or more different information appliances having different input/output formatting capabilities, comprising:

receiving content information of the first formatting language from an Internet web server;

converting the received content information of the first formatting language to an intermediate formatting language so that the received content information can be processed and formatted in accordance with a display capability of a device;

translating the processed content information from the intermediate formatting language to content information of the second formatting language; and transmitting the content information of the second formatting language to the device so that the content information can be displayed on the device.

24. The method of claim 23 further comprising receiving information from a device that indicates the input/output format of the device so that the translated content is generated based on the input/output format of the device.

25. The method of claim 23, wherein the device is a wireless device having a predetermined display screen size.

26. The method of claim 23, wherein the receiving further comprises establishing a communications session with the host system so that information content of the first formatting language can be received by the translator.

27. The method of claim 26, wherein the information content of the first formatting language comprises HTML.

28. The method of claim 26, wherein the intermediate formatting language is XHTML.

29. The method of claim 23, wherein the translation further comprises performing operations with an XML engine.

30. The method of claim 29, wherein the performing operations with an XML engine further comprises comparing an URL Internet address of the received content information with a group of predetermined rulesets using a hashtable module wherein the rulesets define a criteria for translating the content information to the second formatting language; and converting the received content information of the intermediate formatting language to content information of a second intermediate formatting language using a transform processor.

31. The method of claim 30, wherein the second intermediate formatting language comprises RML.

32. The method of claim 30, wherein the group of predetermined rulesets define a branding criteria for the content information of the second formatting language so that the content information of the second formatting language displayed on the device is similar in appearance to that of the content information of the first formatting language received from the webpage.

33. The method of claim 32, wherein the group of predetermined rulesets comprise XSL rulesets defined by the host system.

34. The method of claim 23, wherein the formatting comprises using a layout engine.

35. The method of claim 34, wherein the layout engine comprises extracting portions of the content information of the second intermediate language using a content cutter that are not compatible with a display capability of the device so that the content information of the second formatting language can be generated from the remaining content information of the second intermediate language; dynamically generating a layout format for the content information of the second formatting language that is optimized for the display screen size of the device using a layout processor; and generating the content information of the second formatting language using a protocol processor.

36. The method of claim 35, wherein the layout formatting comprises a presentation shoe that includes at least one presentation card, each presentation card representing a display page of the device, each presentation card including at least a portion of the content information of the second formatting language, wherein subsequent presentation cards in the presentation shoe are linked so that the content information of the second formatting language can be selectively viewed on the device.

37. The method of claim 36, wherein the presentation cards include at least one pane portion thereon and wherein the content information is separated into atomic groups of content information, the atomic groups of content information being organized and assigned to the pane portions of the presentation card so that formatting of the content information can be optimized for the display screen on the device.

38. The method of claim 37, wherein the presentation cards in the presentation shoe are transmitted to the device so that the content information of the second formatting language can be displayed on the device.

39. A system for translating content information from a first formatting language to a second formatting language so that the content information can be displayed on a device, comprising:

a hashtable module for comparing a URL Internet address of a web page including the content information of the first formatting language with a group of predetermined rulesets that define a criteria for translating the content information to an intermediate formatting language to generate content information of the intermediate formatting language;

a transform processor configured to convert the received content information of the intermediate formatting language to content information of a second intermediate formatting language to generate content in the second formatting intermediate language; and a layout engine configured to translate the content information to the second formatting language from the second intermediate formatting language and to format the content information for display on the device.

40. The system of claim 39, wherein the layout engine comprises a content cutter for extracting portions of the content information of the second intermediate language that are not compatible with a display capability of the device so that the content information of the second formatting language can be generated from the remaining content information of the second intermediate language; a layout processor for dynamically generating a layout format for the content information of the second formatting language that is optimized for the display screen size of the device; and a protocol processor for generating the content information of the second formatting language.

41. The system of claim 40, wherein the layout format comprises a presentation shoe that includes at least one presentation card, each presentation card representing a display page of the device, each presentation card including at least a portion of the content information of the second formatting language, wherein subsequent presentation cards in the presentation shoe are linked so that the content information of the second formatting language can be selectively viewed on the device.

42. The system of claim 41, wherein the presentation cards include at least one pane portion thereon and wherein the content information is separated into atomic groups of content information, the atomic groups of content information being organized and assigned to the pane portions of the presentation card so that formatting of the content information can be optimized for the display screen on the device.

43. The system of claim 42, wherein the presentation cards in the presentation shoe are transmitted to the device so that the content information of the second formatting language can be displayed on the device.

44. The system of claim 39, wherein the group of predetermined rulesets define a branding criteria for the content information of the second formatting language so that the content information of the second formatting language displayed on the device is substantially similar in appearance to the content information of the first formatting language received from the webpage.

45. The system of claim 44, wherein the group of predetermined rulesets comprise XSL rulesets defined by the host system.

46. A method for intelligently harvesting information from a data source for display on one or more different information appliances, comprising:

receiving the information from the data source in a first predetermined format wherein the information has predetermined hierarchical relationships;

storing the received information in a relational markup language to convert the received information into a second predetermined format wherein the content of the received information is separated from the relationships between the received information; and outputting information from the second predetermined format into a final format for a particular information appliance having a particular display format.

47. A layout engine for processing incoming information and for generating information that is displayed on one or more different information appliances, comprising:

receiving information to be distributed to the one or more information appliances, the received information having relationships embedded into the content;

mapping the receiving information into a relational hierarchy based on the relationships embedded into the content, the relational hierarchy including one or more atomics containing the content of the receiving information linked to each other based on the relationships in the received information; and processing the relational hierarchy based on a display format of a predetermined information appliance in order to generate a series of displays appropriate for the predetermined information appliance.

48. A method for processing incoming information having content and relationships embedded into the content, comprising:

separating the incoming information into one or more pieces of content having no relationship information;

generating an atomic for each piece of content in the incoming information; and generating a relational hierarchy connecting the atomics to each other in a hierarchical relationship based on the relationships embedded into the incoming information.

* * * * *